(12) United States Patent
Embler

(10) Patent No.: US 7,133,553 B2
(45) Date of Patent: Nov. 7, 2006

(54) CORRELATION-BASED COLOR MOSAIC INTERPOLATION ADJUSTMENT USING LUMINANCE GRADIENTS

(75) Inventor: Gary L. Embler, Redwood City, CA (US)

(73) Assignee: Avago Technologies Sensor IP Pte. Ltd., Singapore (SG)

( * ) Notice: Subject to any disclaimer, the term of this patent is extended or adjusted under 35 U.S.C. 154(b) by 733 days.

(21) Appl. No.: 10/369,356

(22) Filed: Feb. 18, 2003

(65) Prior Publication Data

US 2004/0161145 A1 Aug. 19, 2004

(51) Int. Cl.
  *G06K 9/00* (2006.01)
  *G06K 9/32* (2006.01)
(52) U.S. Cl. ..................................... 382/164
(58) Field of Classification Search .............. 382/162, 382/164, 165, 173, 260, 261, 300; 348/280; 358/1.2, 509, 515, 520, 525, 530
See application file for complete search history.

(56) References Cited

U.S. PATENT DOCUMENTS

| 5,373,322 | A | 12/1994 | Laroche et al. | |
|---|---|---|---|---|
| 5,475,769 | A | 12/1995 | Wober et al. | |
| 2002/0015162 | A1* | 2/2002 | Hoshi et al. | 358/1.2 |
| 2002/0085770 | A1* | 7/2002 | Han | 382/279 |
| 2002/0167602 | A1* | 11/2002 | Nguyen | 348/280 |
| 2003/0007702 | A1* | 1/2003 | Aoyama et al. | 382/300 |
| 2003/0016879 | A1* | 1/2003 | Slavin | 382/261 |
| 2003/0095715 | A1* | 5/2003 | Avinash | 382/260 |
| 2004/0013320 | A1* | 1/2004 | Atkins et al. | 382/300 |

* cited by examiner

*Primary Examiner*—Amir Alavi

(57) ABSTRACT

Processing a digitized image signal includes selectively adjusting interpolated color values on the basis of correlations between pre-identified reference patterns of values and the patterns of values within the neighborhoods in which the interpolated color values reside. The reference patterns may be various possible combinations of a high reference value and a low reference value within a selected neighborhood configuration. When minimum and maximum color values are used as the reference values, the reference patterns are representative of the various maximum luminous gradient possibilities within the selected neighborhood configuration.

12 Claims, 21 Drawing Sheets

CORRELATION-BASED COLOR MOSAIC INTERPOLATION ADJUSTMENT USING LUMINANCE GRADIENTS

TECHNICAL FIELD

The invention relates generally to processing a digitized image signal and more particularly to adjusting interpolation values to reduce artifacts.

BACKGROUND ART

A digitized image signal generated by a two-dimensional array of sensors consists of pixel values representing the color intensities at each point of the color image. Conventional color photography utilizes three overlapping color sensing layers having sensitivities in different regions of the color spectrum. Typically, red, green and blue are the three selected colors. However, digital cameras are limited to a single array of sensors, so that there is only one "layer." Within this layer, each sensor determines the intensity of a particular color. As a result, the color array does not produce a color image in the traditional sense, but rather a collection of individual color samples. The assignment of the colors to the individual pixels within the array is sometimes referred to as the color filter array (CFA), or the color "mosaic pattern." To produce a true color image in which each pixel has a full set of color samples, a substantial amount of interpolation is required in order to estimate the missing information. The interpolation operation is typically referred to as "demosaicing."

The general concept of demosaicing will be described with reference to FIG. 1. An image sensor array 10 for capturing a digitized image signal is represented by a mosaic pattern that follows an arrangement referred to as a Bayer pattern (i.e., a repeating 2×2 sensor array kernel having two green pixels diagonally positioned within the kernel and having one red sensor and one blue sensor). The sensor array is a color-sampling device that acquires its samples using a number of discrete color-specific detectors. By example, the array may have 1500 columns and 1500 rows, but the numbers of columns and rows are not significant to the overall understanding of the process.

In the demosaicing of the image that is captured by the sensor array 10, the image may be considered as being decomposed into four input image planes 12, 14, 16 and 18. Each input image plane satisfies two conditions. First, the planes have the identical number of samples within a horizontal and vertical sampling interval. Second, all of the samples in the given input image plane have identical color properties, although multiple image planes can have the same color properties. For example, the image planes 12 and 18 have green samples, as indicated by the letter "G." Image plane 14 includes all of the samples that are specific to the color blue, as indicated by the letter "B," while image plane 16 includes all of the red samples from the sensor array 10, as indicated by the letter "R." Alternatively, only three input image planes may be considered, if the two image planes having green samples are combined. While the illustrated embodiment shows a Bayer pattern, other patterns are used by persons skilled in the art.

In FIG. 1, there are three different colors and there are four possible color arrangements within a two-by-two neighborhood of pixels. The number of possible color arrangements is consistent with the number of image planes 12, 14, 16 and 18. It is possible to use twelve convolution kernels (3×4=12) in the demosaicing process. The twelve convolution kernels are selected on the basis of which of the input image planes contains the sample for the pixel that is to be the current center of a movable neighborhood in which interpolation occurs and on the basis of which monochromatic output plane 20, 22 and 24 is presently being constructed. Each monochromatic output plane contains original color samples and contains interpolated intensity values that are derived from the intensity values of the input image planes.

To generate the missing information at a particular pixel, information from neighboring pixels is used, since there is a statistical dependency among the pixels in the same region of a particular image. Various demosaicing algorithms are available. "Bilinear interpolation" is an approach that attempts to minimize the complexity of the demosaicing operation. A bilinear interpolation algorithm interpolates color intensities only from the same-color sensors. That is, the information from the red sensors is treated independently from the information from the green and blue sensors. Similarly, the information from the green sensors is treated independently from the red and blue sensors, and the information from the blue sensors is treated independently from the outputs of the red and green sensors. To provide a red intensity value at a given pixel, the values measured by the red sensors in a designated size neighborhood (e.g., in a neighborhood of nine sensors having the given pixel as its center) are interpolated. If the mosaic pattern of sensors is a Bayer pattern, the bilinear interpolation algorithm may use twelve kernels of convolution to reconstruct the image, as previously noted.

The bilinear interpolation approach of isolating the different colors in the demosaicing operation requires a relatively low level of computational overhead. The tradeoff is that the reconstructed image often contains significant artifacts. Other interpolation approaches that consider different-color sample values may introduce fewer artifacts, but the cost may be a significant increase in the computational overhead.

SUMMARY OF THE INVENTION

Processing a digitized image signal in accordance with the present invention includes interpolating color values that are based upon color samples of nearby pixel locations, and then selectively adjusting individual interpolated color values according to correlations between pre-identified reference patterns of values and the patterns of values within the neighborhoods in which the interpolated color values reside.

In a low computation embodiment, the reference patterns are various possible combinations of a high reference value and a low reference value within a selected neighborhood configuration. The high reference value may be a maximum color value of the digitized image signal, while the low reference value may be the minimum color value. When minimum and maximum color values are used, the reference patterns are representative of the various maximum luminous gradient possibilities within the selected neighborhood configuration.

The reference patterns are selected during the pre-operation setup of the system. Additionally, each reference pattern may be assigned a specific pattern output value that is used to determine an adjustment amount, which may be positive, negative or zero. The adjustment amount is employed to selectively increment or decrement interpolated color values when one of the reference patterns is identified in a correlation process during normal operation of the system.

The interpolated color values may be determined from the digitized image signal using known techniques. For example, binary interpolation may be employed. Then, the individual interpolated color values are selectively adjusted using correlation processing. As an example, a first interpolated color value (ICV) is adjusted on the basis of identifying a correlation between a particular one of the reference patterns and the pattern of neighboring color values having the first ICV as it its center. That is, in one embodiment, the first ICV is the center value in a neighborhood of color values and the center value is conditionally adjusted, with the conditions being based upon relationships among relevant values, as will be described below. The conditional adjustment is repeated for each interpolated color value.

Each reference pattern is assigned a "pattern output value." In the conditional adjustment of each interpolated color value, such as the first ICV, the difference between the interpolated color value and the pattern output value assigned to the reference pattern for which there is a correlation is determined. Thus, the difference between the first ICV and the relevant pattern output value is identified. This difference is referred to as the adjustment amount. The adjustment amount may be positive, negative or zero. The conditional adjustment of the first ICV results in the selection of the appropriate one of (1) the first ICV minus the adjustment amount, (2) the sum of the first ICV and the adjustment amount, and (3) the value of the original color sample for the pixel location of the first ICV. The first option (first ICV minus the adjustment amount) is selected if the first ICV is greater than the pattern output value and if the original color sample is less than the first ICV and is less than first ICV minus the adjustment amount. The second option (i.e., the sum of the first ICV and the adjustment amount) is selected under the condition that the first ICV is less than the pattern output value and under the condition that the value of the original color sample is greater than the first ICV and greater than the sum of the first ICV and the adjustment amount. The third option is selected when the conditions for selecting the first option and the conditions for selecting the second option are not met.

In application, the invention may be implemented as a kernel that is determined from a priori assumed image characteristics in the form of pre-determined (as opposed to learned) local-sample neighborhood patterns. The procedure attempts to exploit local image sample interdependencies, in order to preserve detail, while minimizing artifacts.

BRIEF DESCRIPTION OF THE DRAWINGS

Figure 8:
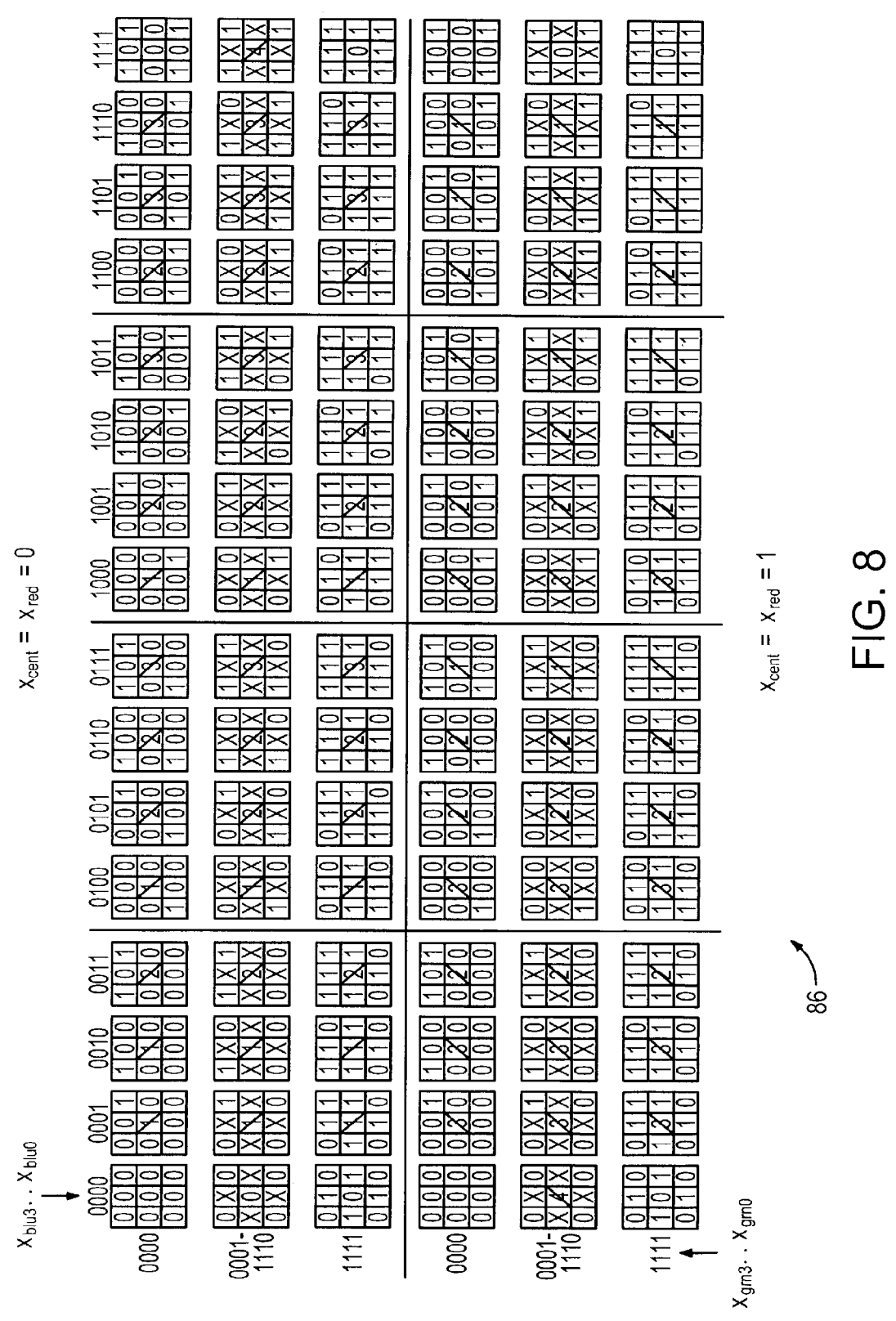

FIGS. 8 and 9 represent an example of the use of a set of reference patterns to be used when the original center pixel location is red, but the output value is blue.

Figure 10:
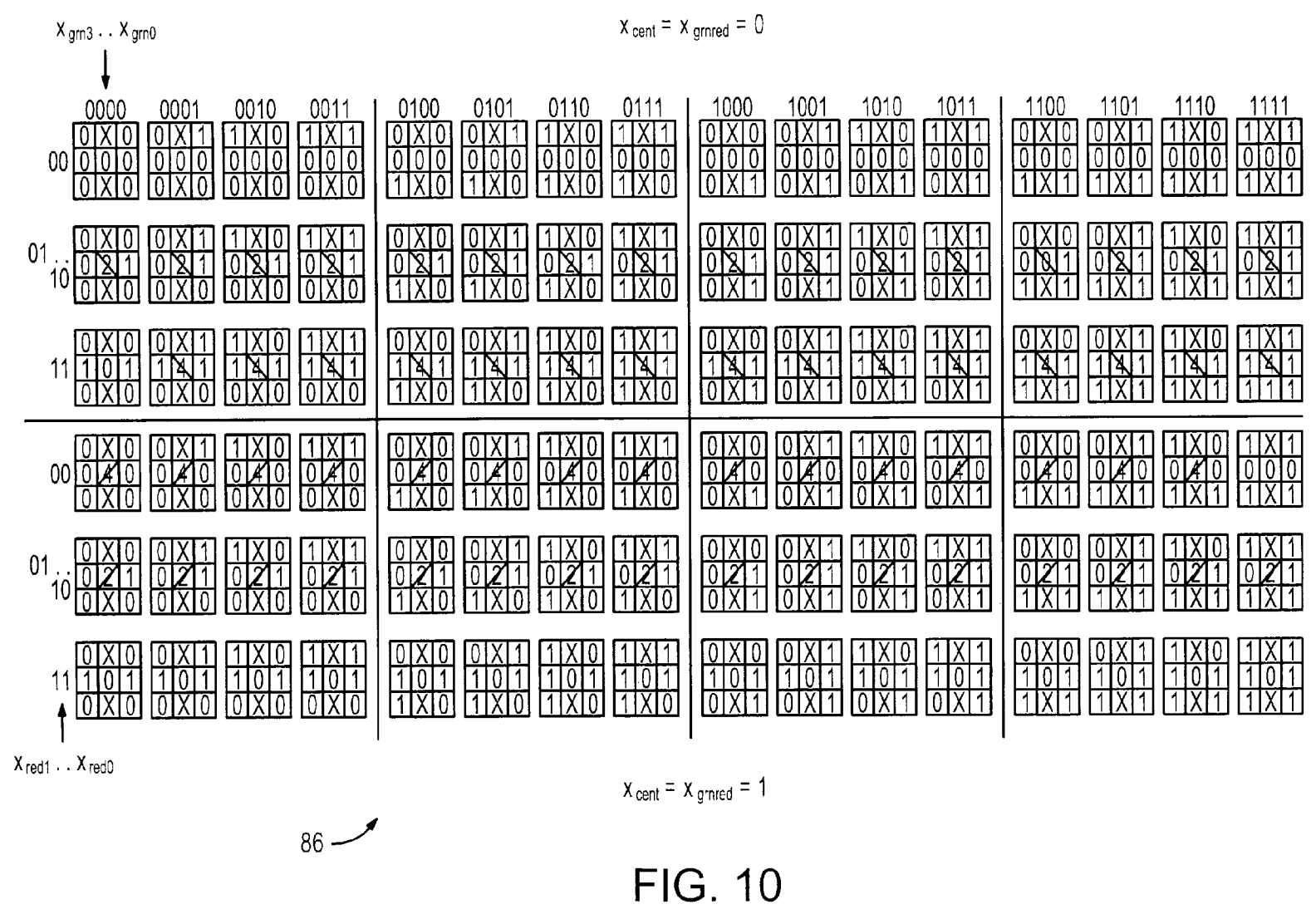

FIGS. 10 and 11 represent an example of the use of a set of reference patterns to be used when the original center pixel location is green/red, but the output value is red.

Figure 12:
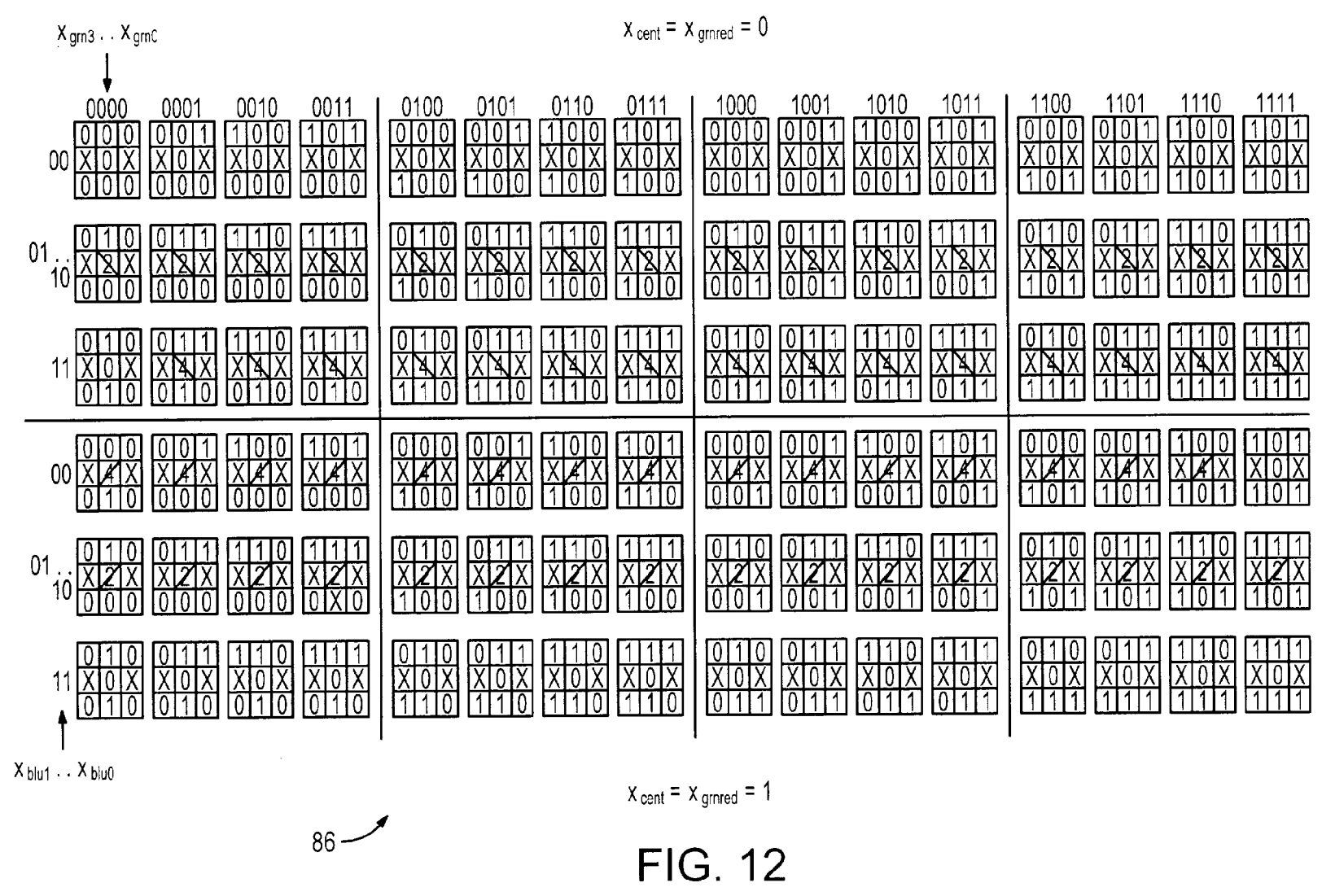

FIGS. 12 and 13 represent an example of the use of a set of reference patterns to be used when the original center pixel location is green/red, but the output value is blue.

Figure 14:
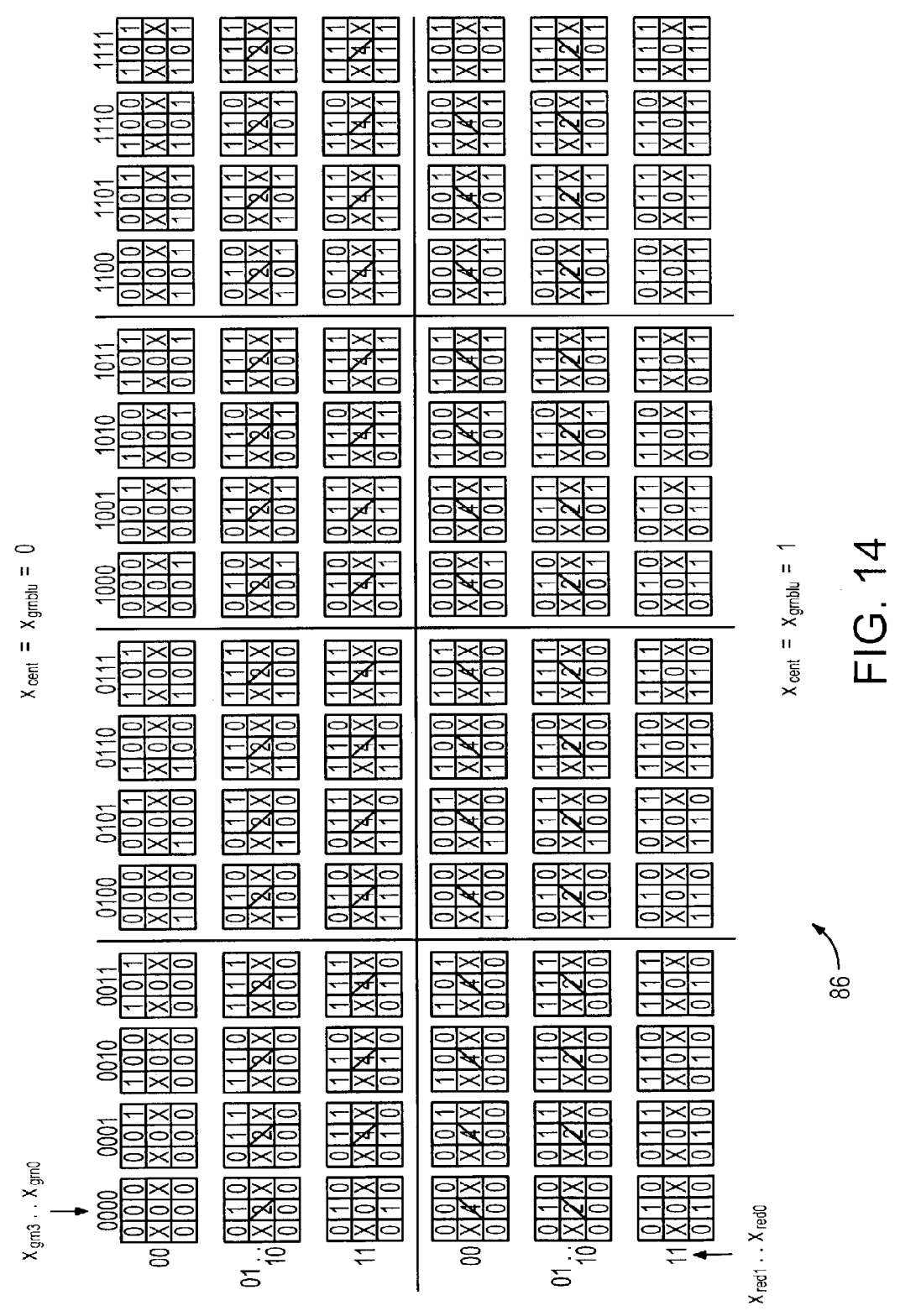

FIGS. 14 and 15 represent an example of the use of a set of reference patterns to be used when the original center pixel location is green/blue, but the output value is red.

Figure 16:
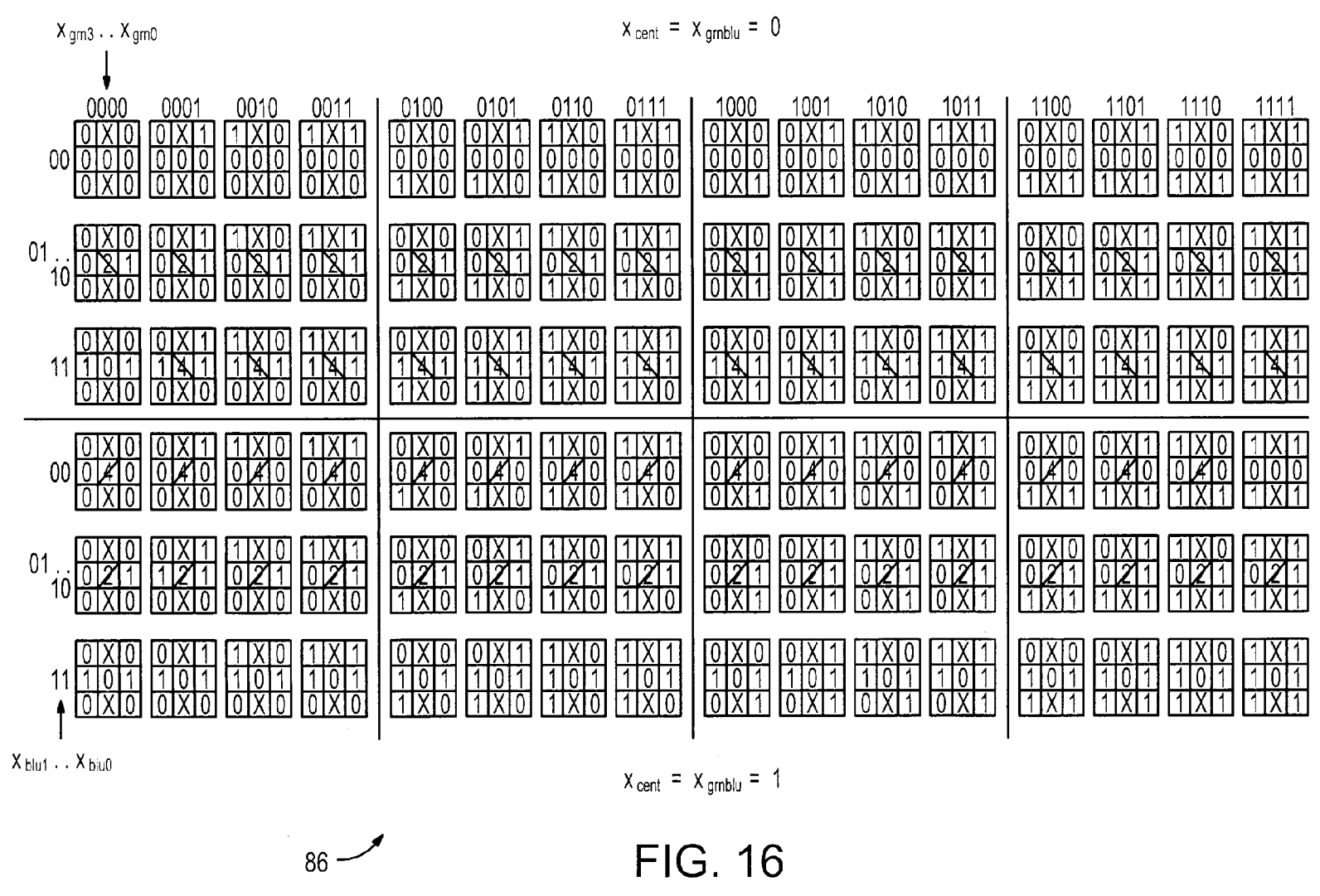

FIGS. 16 and 17 represent an example of the use of a set of reference patterns to be used when the original center pixel location is green/blue, but the output value is blue.

Figure 18:
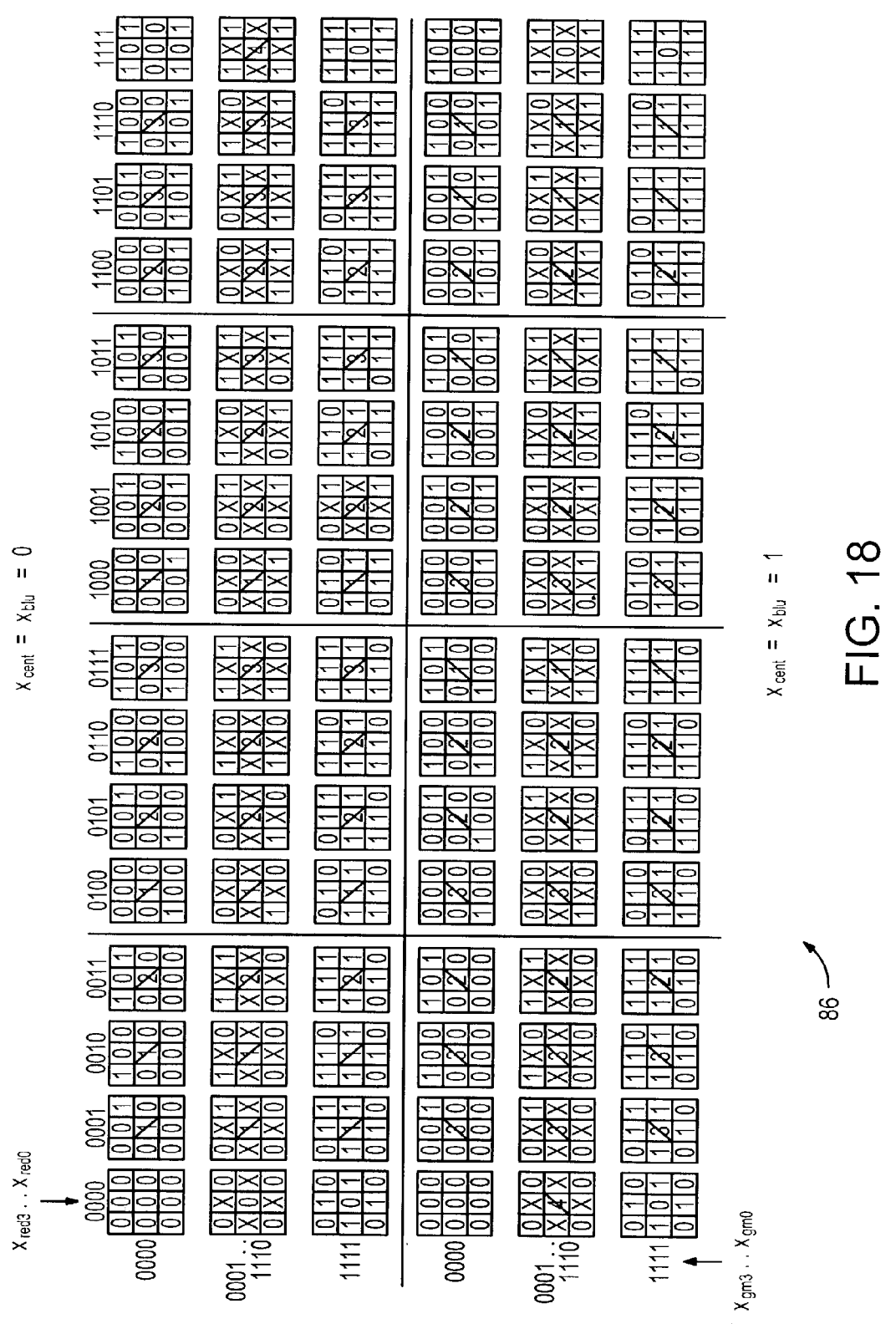

FIGS. 18 and 19 represent an example of the use of a set of reference patterns to be used when the original center pixel location is blue, but the output value is red.

DETAILED DESCRIPTION

Figure 1:
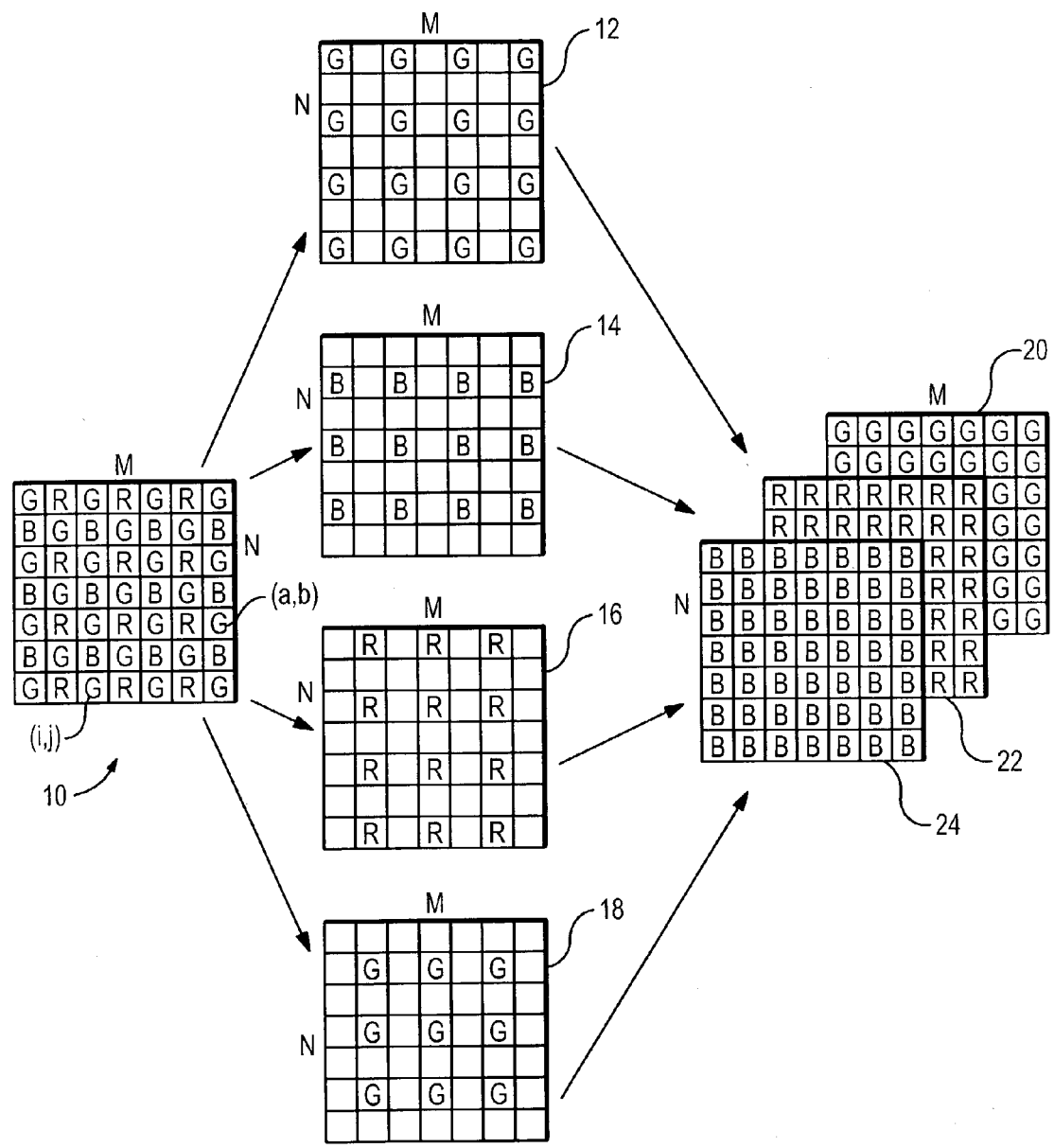
FIG. 1 is a schematic representation of a demosaicing operation which may be used as initial steps of the present invention.

The methodology of the present invention is based on the assumptions that different local sample neighborhoods of images share similar patterns and that the pattern similarities extend across different scales. These assumptions allow a priori information from local sample patterns to be used in calculating final interpolated color values. On the basis of the assumptions, patterns of high-resolution neighborhoods (i.e., sample neighborhoods in which color values for all of the colors are present) are similar to patterns of the corresponding low-resolution neighborhoods (e.g., color mosaic sample neighborhoods). That is, in FIG. 1, the pattern similarity extends from the low-resolution of the color mosaic information from the sensor array 10 to the corresponding high-resolution neighborhoods within the collection of output planes 20, 22 and 24.

In order to use the methodology, the local sample patterns and their mapping to the corresponding interpolated color values must be defined. Mapping information either can be learned from available data (such as sampled images) or can be derived from assumptions regarding expected image characteristics. The present invention uses the latter approach of employing assumptions concerning expected image characteristics. An overview of the approach will be described with reference to FIG. 2. At step 26, the size and the configuration of the "local" neighborhood is selected. A small, odd-number dimensioned, but square, spatial sample neighborhood has been determined to be a desirable configuration. For example, the local neighborhood may be a 3×3 array of values.

At step 28, at least one set of reference patterns of reference values is derived. The set of reference patterns may be various combinations of a high reference value and a low reference value within the selected neighborhood size and configuration. The high reference value may be the maximum color value of the digitized image signal that will be considered. Similarly, the low reference value may be the minimum color value of the digitized image signal. Thus, the high reference value may be the number "1," while the low reference value may be the number "0." The set of reference patterns will thereby represent various luminance gradient possibilities within the selected neighborhood configuration.

At step 30, starting luminance values are provided. Steps 26 and 28 may be considered to be setup steps, while steps 30 and 32 may be considered to be execution steps. The starting color luminance values may be bilinear interpolated color values, as explained with reference to FIG. 1.

At step 32, each starting color luminance value is considered in order to determine whether the value should be adjusted on the basis of identifying neighborhood pattern similarities. For a particular starting color luminance value, its local neighborhood is the one in which the value is at the center of the neighborhood. The neighborhood pattern is compared to the set of local neighborhood reference patterns derived in step 28. Each local neighborhood reference pattern is assigned a specific output value that may be considered the "desired" output value, given the luminance pattern of that reference pattern. This desired output value is compared with the actual starting color luminance value to determine an "adjustment amount." The starting color luminance value of concern will be adjusted by a maximum of the adjustment amount assigned to the reference pattern having the greatest neighborhood similarity. The adjustment amount is intended to be proportional to the luminance gradient that is characteristic of the reference pattern to which it is assigned. The adjustment direction (i.e., increase, remain the same, or decrease) is toward the original sample value, such as the sample value from the original mosaic image. However, there are rules with regard to the adjustment. A particular interpolated color value can be moved closer to or equivalent to the particular color sample originally assigned to the color sample location for which the interpolated color value was interpolated. With respect to the selective adjustment, the maximum adjustment amount is one in which the adjusted interpolated color value is equivalent to the color sample originally assigned to that color sample location.

Figure 2:
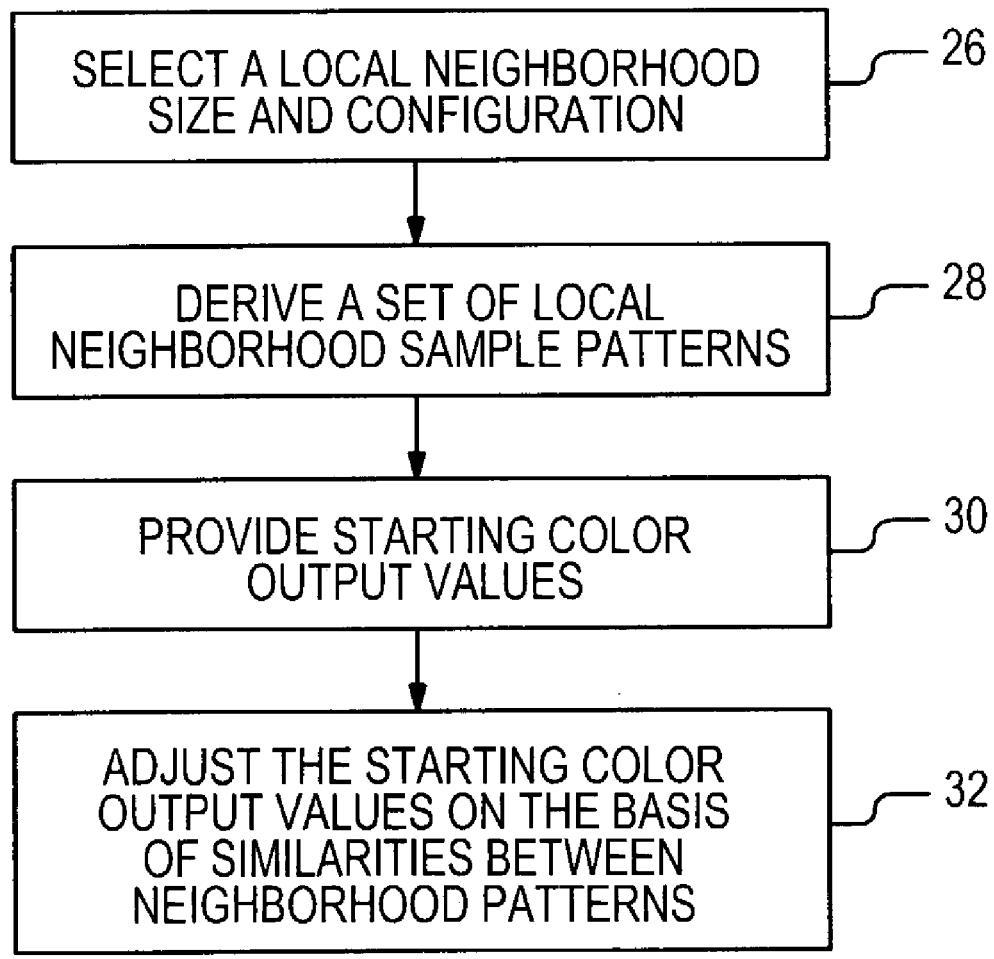
FIG. 2 is a process flow of steps which illustrates the broad concept of the invention.

The procedure represented by the overview in FIG. 2 takes into account the assumed correlation between the local neighborhood sample values and the expected center color values. The procedure is intended to improve perceptual quality by driving the overall center color toward a more neutral tone, thus minimizing the perception of chromatic aliasing artifacts (color fringes) near large luminance gradients.

Figure 3:
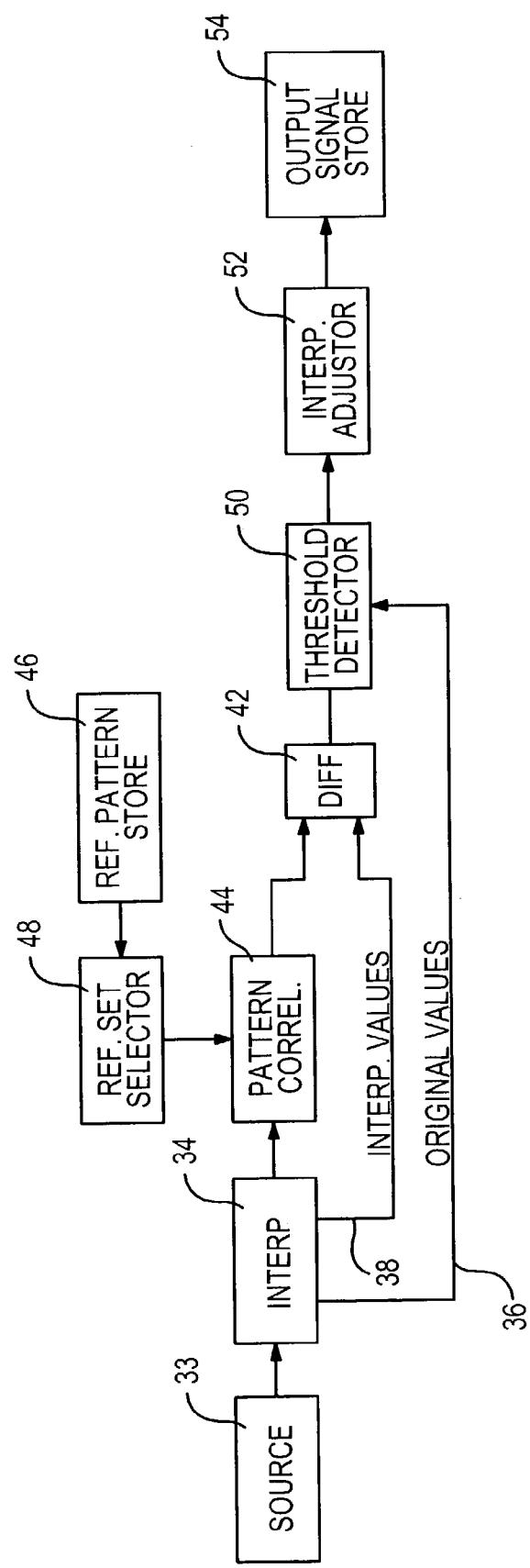
FIG. 3 is a schematic view of components which may be used to implement the process flow of steps of FIG. 2.

FIG. 3 illustrates an example of an arrangement of components for a system that implements the procedure of FIG. 2. The system includes a source 33 of an image signal. For example, the source may be the image sensor array 10 of FIG. 1, which generates a Bayer color mosaic pattern. However, the invention may be used with other image sources.

The image signal from the source 33 is processed by an interpolator 34. As one possibility, the interpolator may perform bilinear interpolation, as was described with reference with FIG. 1, in order to generate the three output planes 20, 22 and 24. As represented in FIG. 3, the interpolator has three separate outputs. The first output 36 provides access to the original uninterpolated color values. The second output 38 provides the interpolated values to a differencing device 42. The third output 40 provides the neighborhoods of values that are correlated with the reference patterns of reference values that were derived in step 28 of FIG. 2. Each neighborhood of sample values that is to be compared with the set of reference patterns has an interpolated value as its center, with the center value being the one under consideration with respect to adjustments in accordance with the invention. In FIG. 3, a pattern correlator 44 provides the comparisons with the set of reference patterns.

A reference pattern store 46 is used for storage of the various reference patterns. As previously described, the reference patterns may be determined from combinations of minimum and maximum local sample values. For each pattern of minimum and maximum local sample values, an expected ("desired") pattern output value is assigned. The assignment is based upon rules that will be described in detail below, when referring to FIG. 5.

In the embodiment shown in FIG. 3, a reference set selector 48 is included. A number of different sets of reference patterns may be derived in the step 28 of FIG. 2. The set that is selected by the selector 48 is dependent upon the configuration of colors within the neighborhood to which the set is to be correlated. That is, for a particular neighborhood of samples from the third output 40 of the interpolator 34, a set of corresponding neighborhoods will be selected from the reference pattern store 46. For the Bayer color mosaic, sets of patterns may arise from (1) different combinations of the minimum and maximum values of the green samples and (2) different combinations of the minimum and maximum values of samples that are the same color as the center color being considered for adjustment. When the interpolated color is green, the only reference patterns that are considered are those arising from the minimum and maximum values of green samples, since there is a high perceptual correlation of green with image luminance.

To determine the degree and direction of adjustment to the interpolated value under consideration, the pre-assigned pattern output value of a reference pattern is compared with the interpolated value at the center of a pattern for which there is a determined correlation. Thus, after the pattern correlator 44 identifies a correlation between a pattern received from the interpolator 34 and a particular reference pattern from the reference set selector 48, the pre-assigned value of the reference pattern is compared to the interpolated value at the center of the pattern from the interpolator 34. The maximum degree and the direction of adjustment are the difference between the pre-assigned value and the interpolated center value. This difference determines the approximate weighting factors for the mapping of the sample values to the final interpolated output values.

The differencing device 42 cooperates with a threshold detector 50 and an interpolation adjustor 52 to selectively vary the interpolation values output from the interpolator 34. The adjusted interpolated values are stored at an output signal store 54. The cooperative operations of these components will be described in greater detail with reference to FIGS. 4 and 5.

Figure 4:
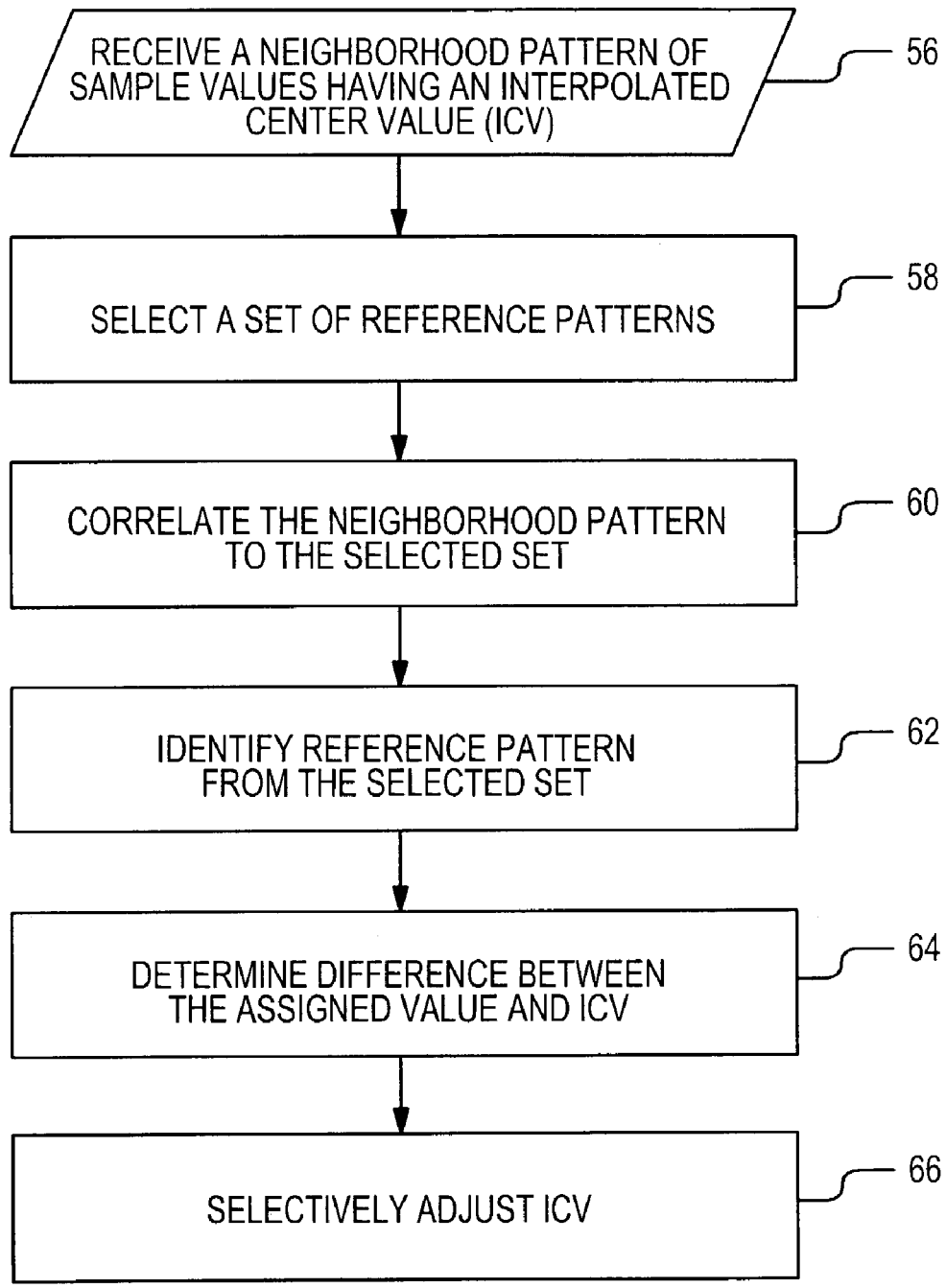
FIG. 4 is a more detailed description of the process of FIG. 2.

In FIG. 4, the step 56 of receiving a local neighborhood pattern of sample values is representative of transmissions from the interpolator 34 of FIG. 3 to the pattern correlator 44 via the third output 40. As previously stated, the local neighborhood may be an odd-number dimensioned, square spatial sample neighborhood. At the center of the local neighborhood is the interpolated center value (ICV) that is under consideration with respect to adjustment. At step 58, the appropriate set of reference patterns is selected by the reference set selector 48. The reference patterns are neighborhoods that are dimensioned to correspond to the local neighborhood pattern of sample values.

At step 60, the pattern correlator 44 performs its correlation processing to identify a particular reference pattern from the selected set of reference patterns, as indicated at step 62. In the following step 64, the differencing device 42 calculates the difference between the value that was assigned to the identified reference pattern and the ICV of the local neighborhood pattern of sample values. Finally, at step 66, the ICV is potentially adjusted.

Figure 5:
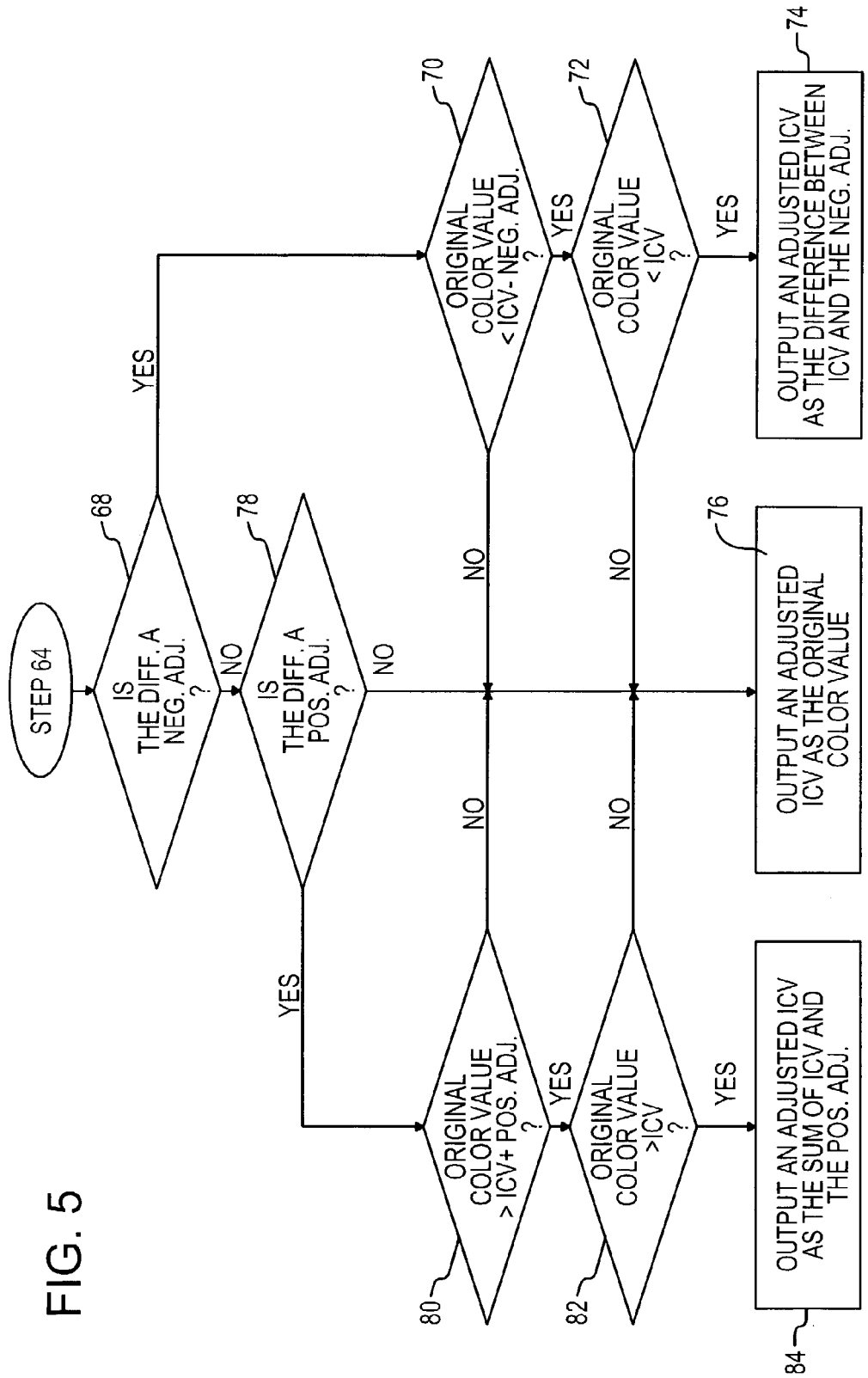
FIG. 5 is a detailed description of one embodiment of the selective adjustment step of FIG. 4.
Figure 6:
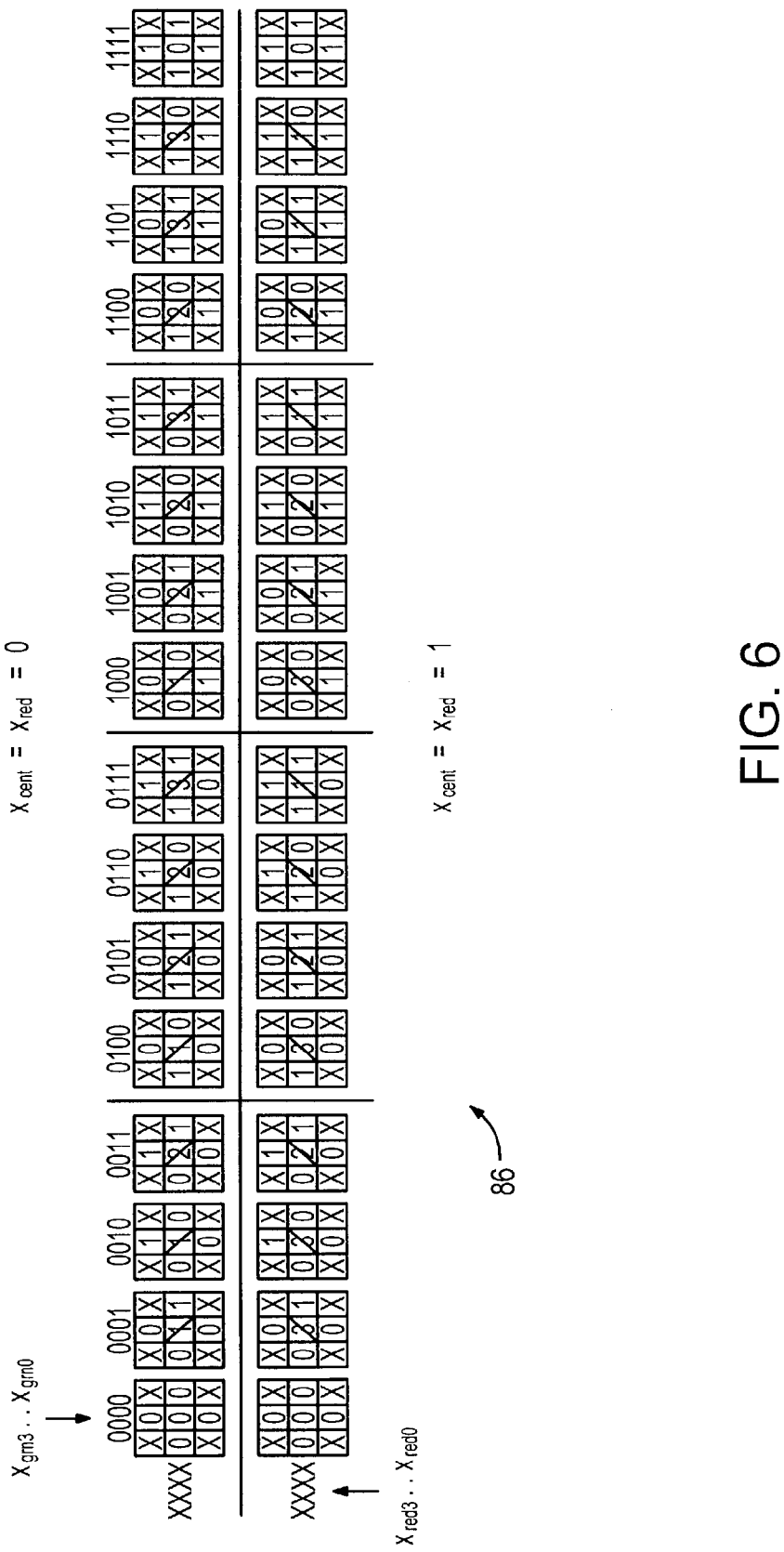
FIGS. 6 and 7 represent an example of the use of a set of reference patterns to be used when the original center pixel location is red, but the output value is green.
Figure 7:
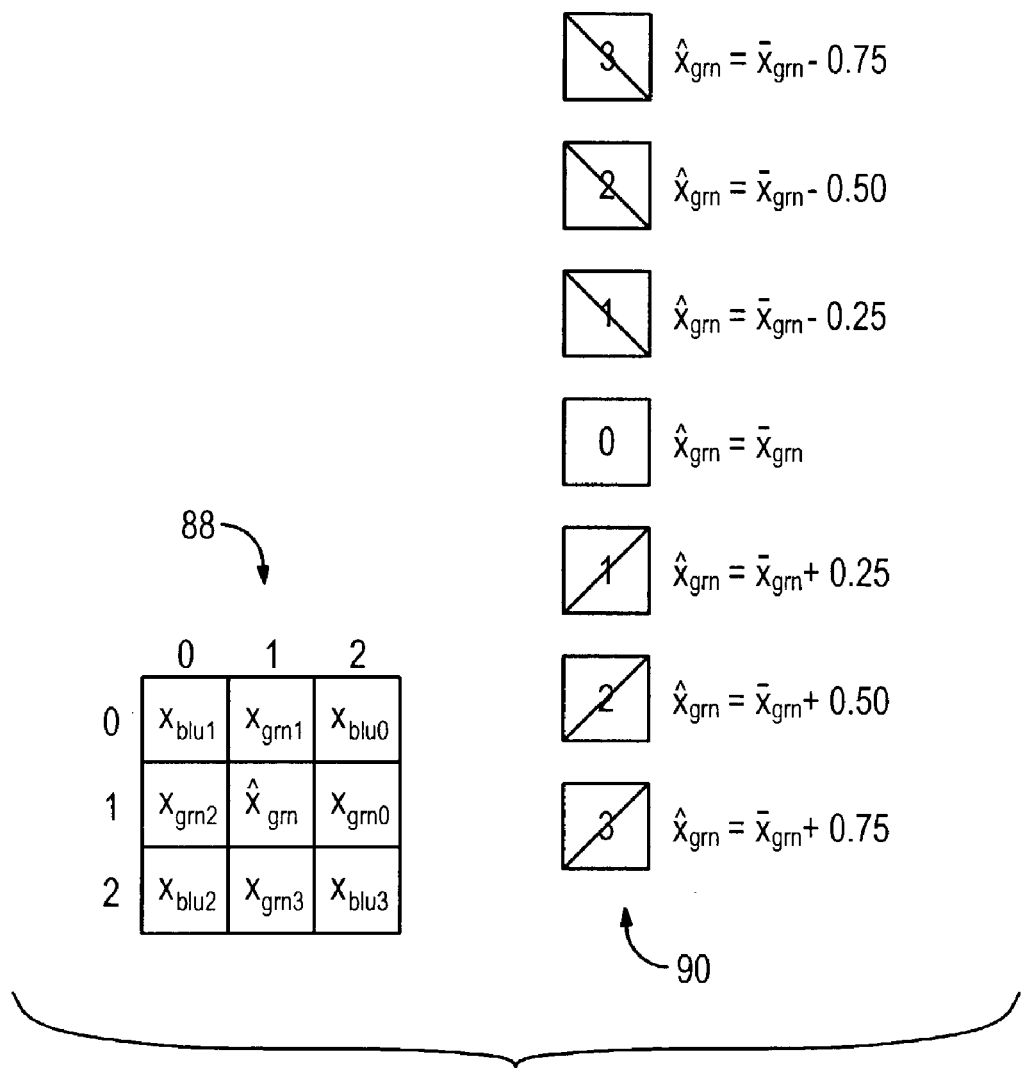
Figure 9:
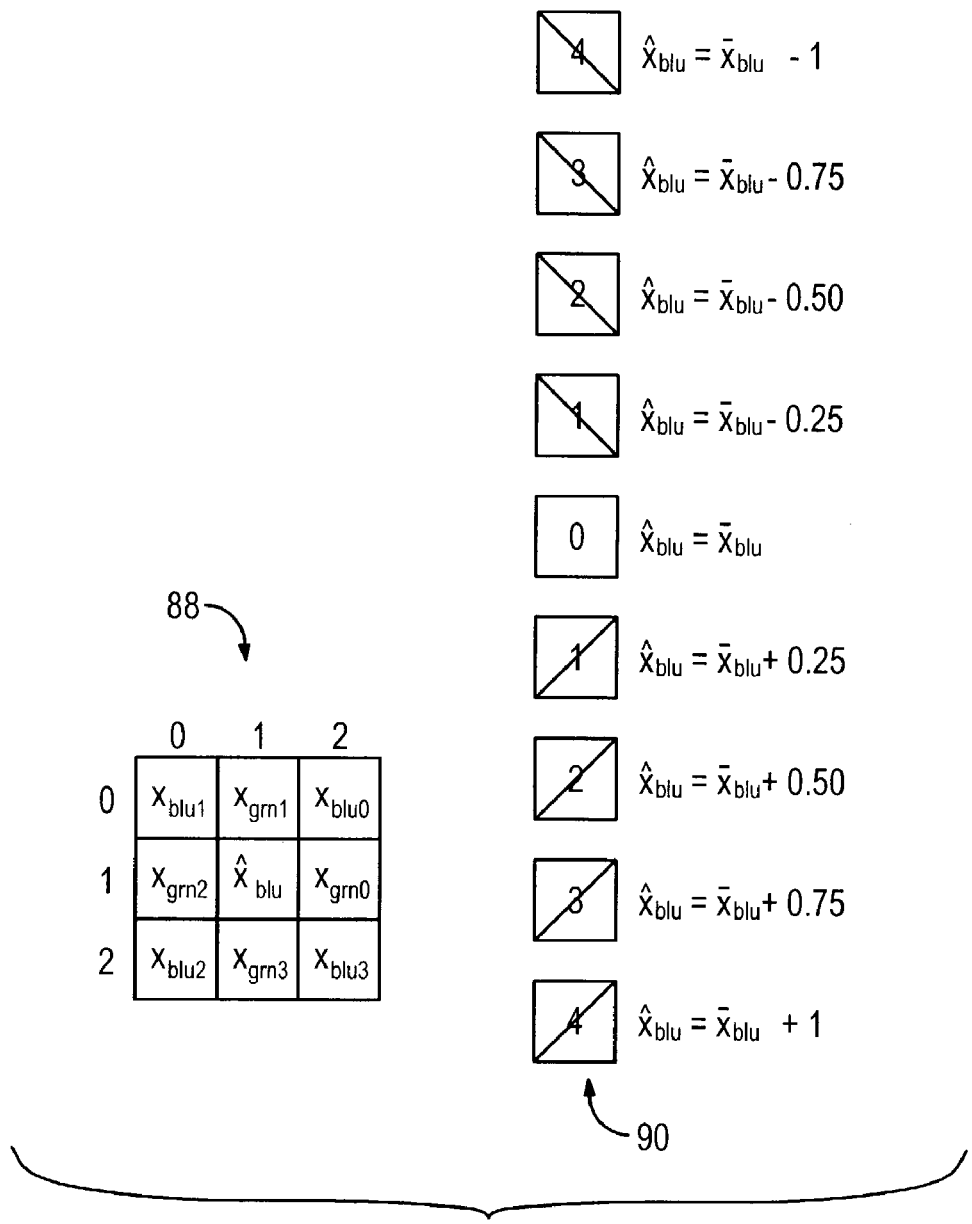
Figure 11:
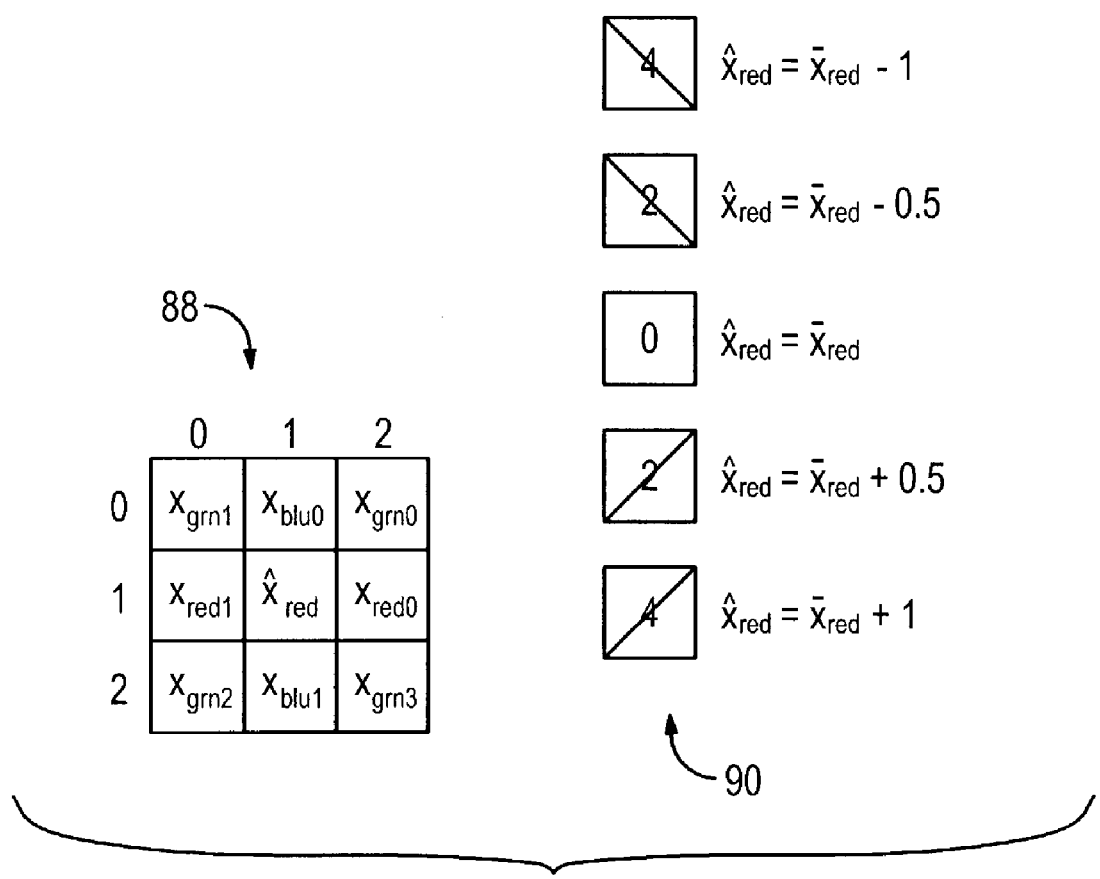
Figure 13:
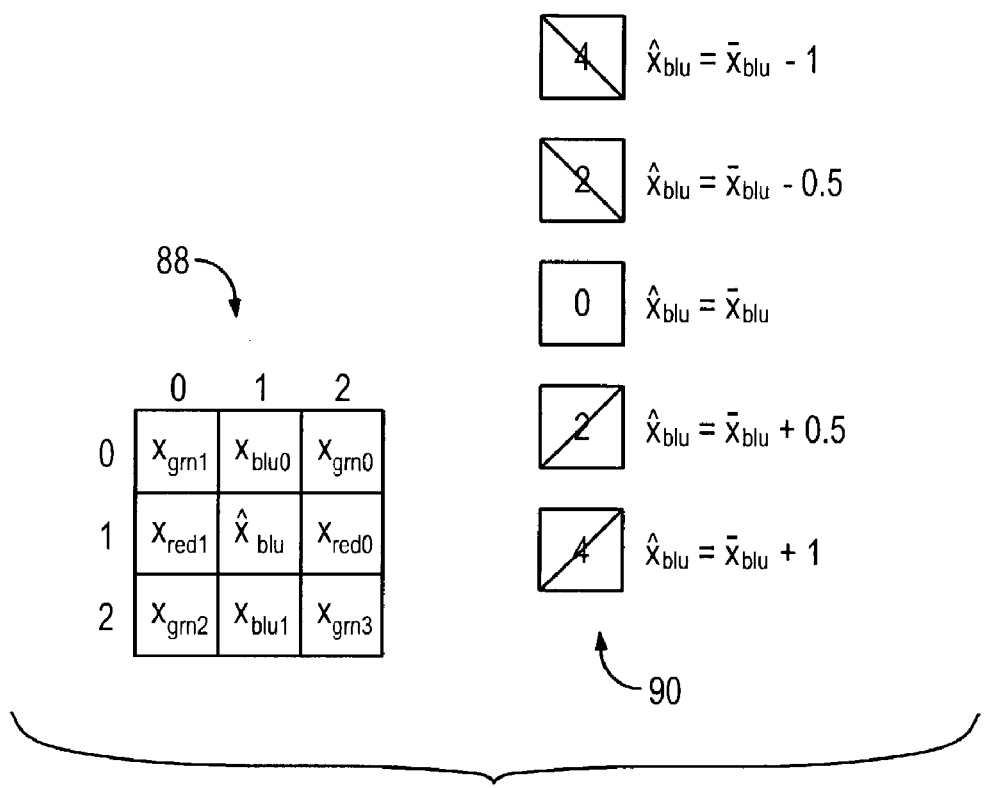
Figure 15:
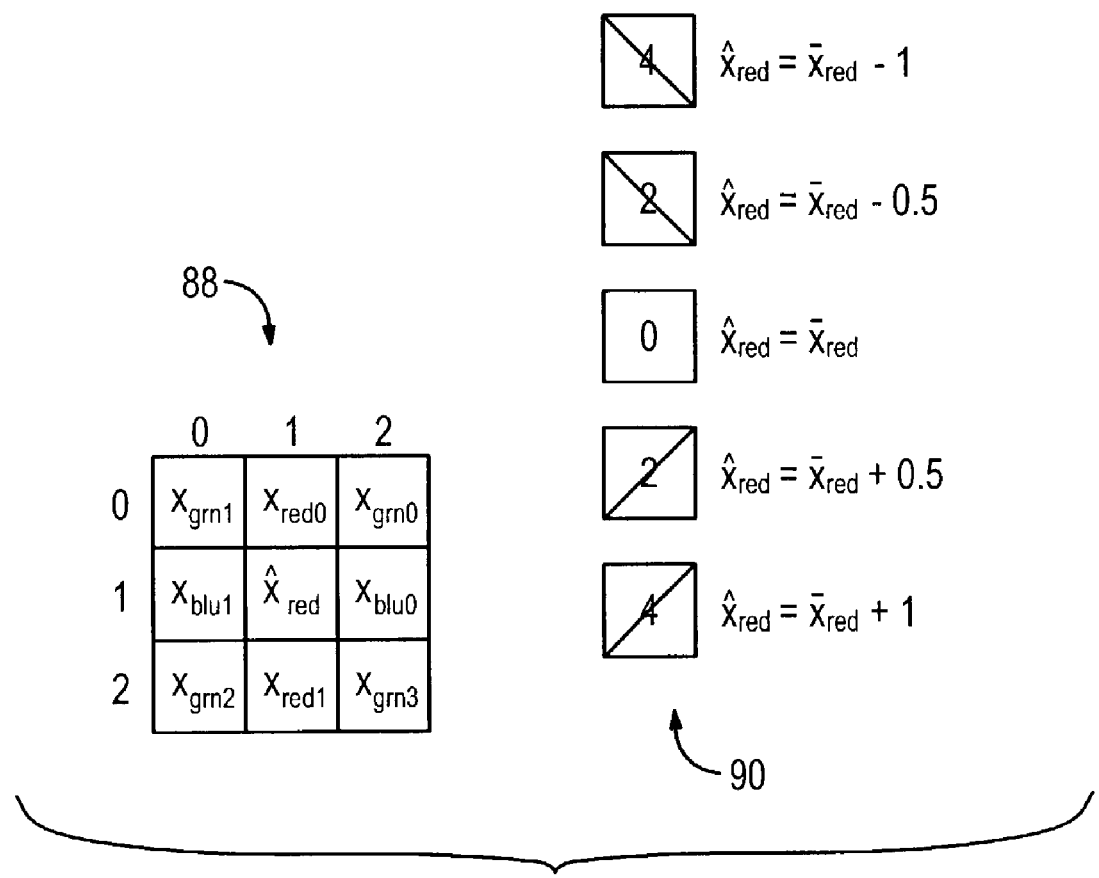
Figure 17:
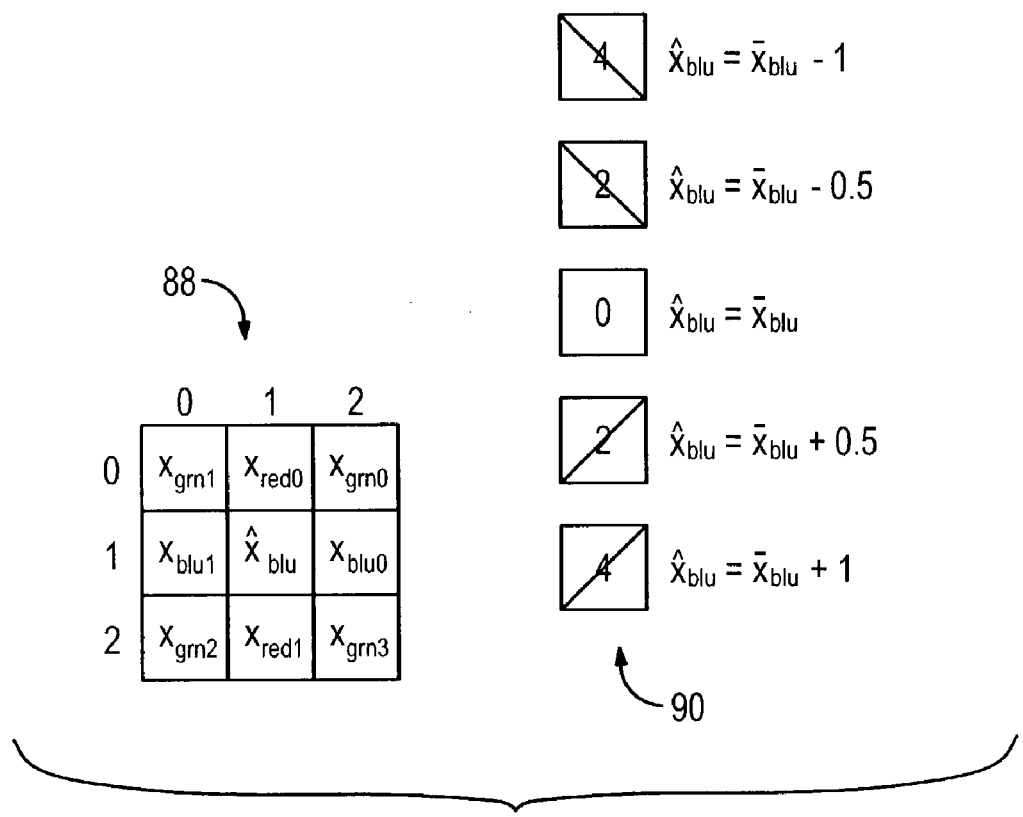
Figure 19:
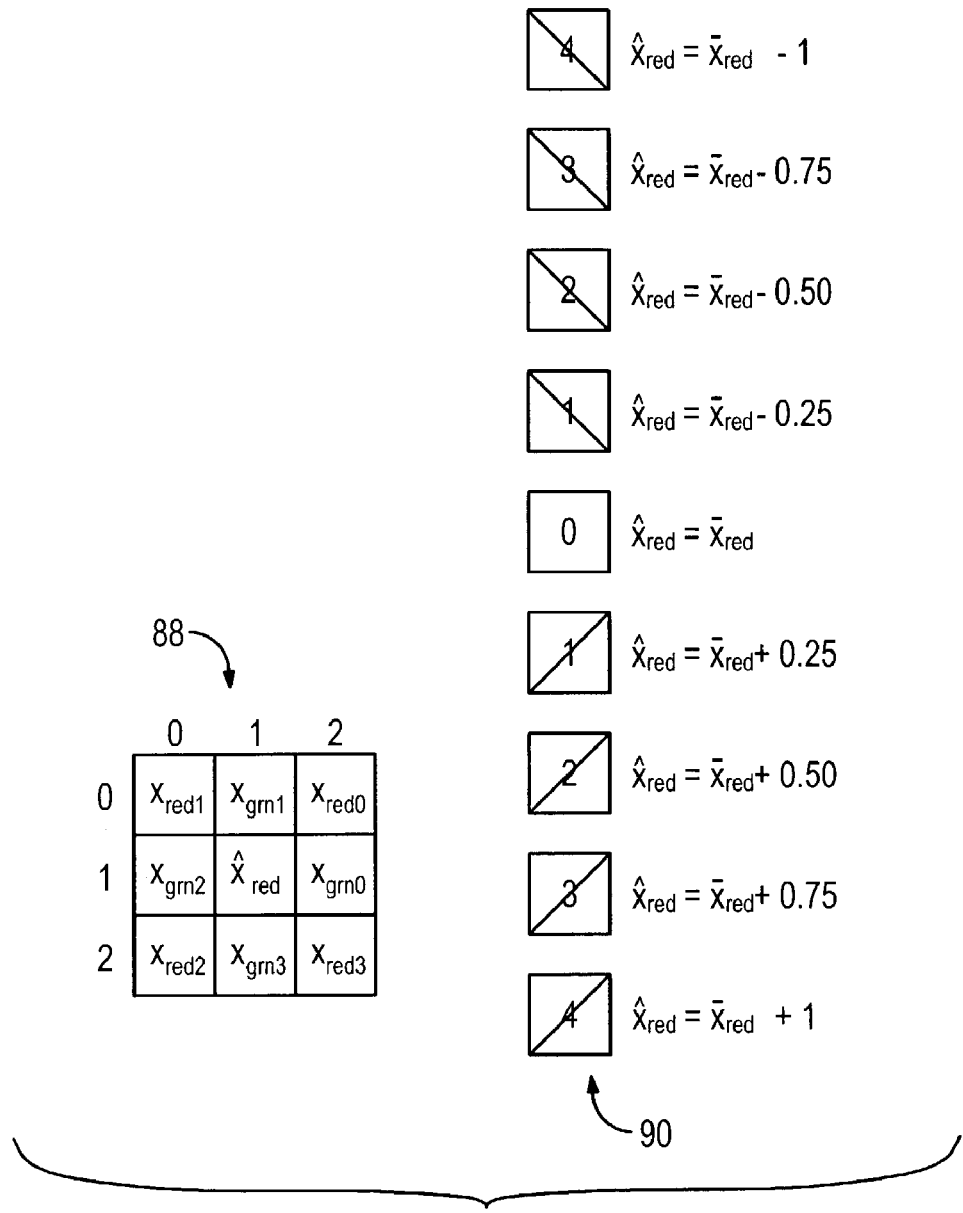

One possible flow of process steps for implementing the step 66 of selectively adjusting the ICV of the local neighborhood pattern is shown in FIG. 5. From the differencing step 64 that is executed by the differencing device 42 of FIG. 3, a number of mathematical calculations are performed by the threshold detector 50. At decision step 68, the difference between the assigned value of the reference pattern and the ICV is considered in order to determine whether the difference is a "negative adjustment." If the assigned value minus the ICV is negative, the process progresses to step 70. As shown in FIG. 3, the original values (i.e., the uninterpolated values) are supplied to the threshold detector 50. If the original color value (i.e., the sample) that corresponds to the ICV is less than the ICV minus the negative adjustment, decision step 72 is considered. At step 72, it is determined whether the original color value is less than the ICV. Affirmative responses at decision steps 68, 70 and 72 result in an adjustment to the ICV, as indicated at step 74. The adjusted ICV is the difference between the ICV and the negative adjustment value. On the other hand, if a negative response is generated at either decision step 70 or decision step 72, the output from the interpolator adjustor 52 is the original color value, as indicated at step 76.

Returning to decision step 68, if a negative response is generated, the determination is made at step 78 of whether the difference between the assigned valued of the reference pattern and the ICV is a positive adjustment value. If the difference is a positive adjustment, step 80 determines whether the sum of the ICV and the positive adjustment value is exceeded by the original color value for the sample that corresponds to the position of the ICV being considered. If "yes," step 82 determines whether the original color value is greater than the ICV. Affirmative responses at steps 80 and 82 result in the step 84 of outputting an adjusted ICV that is the sum of the ICV and the positive adjustment value. A negative response at either step 80 or step 82 results in the original color value being used as the adjusted ICV (step 76).

The flow of steps of FIG. 5 may be stated mathematically. For an N×N element mosaic, where N is an odd number, the methodology may be presented in the general form:

$$\hat{x} = f(x[n_1, n_2]) = \begin{cases} \bar{x} - \tilde{x}_{neg} & \text{if } \bar{x} > x_{cent} \text{ and } \bar{x} - \tilde{x}_{neg} > x_{cent}, \\ \bar{x} + \tilde{x}_{pos} & \text{if } \bar{x} < x_{cent} \text{ and } \bar{x} + \tilde{x}_{pos} < x_{cent}, \text{ or} \\ x_{cent} & \text{otherwise} \end{cases} \quad \text{Eq. 1}$$

where $\hat{x}$ is the adjusted ICV at either step 74, 76 or 84, $x[n_1,n_2]$ is the local neighborhood having ICV as its center, where $n_1, n_2 = 0, 1, \ldots, N-1$ is the local neighborhood sample value 2 D array, $\bar{x}$ is the local neighborhood ICV prior to adjustment, $\tilde{x}_{neg}$ and $\tilde{x}_{pos}$ are, respectively, the local-neighborhood-based negative and positive adjustment values, and $x_{cent}$ is the original color value that is considered in steps 70, 72, 80 and 82.

As can be seen by either viewing the process steps of FIG. 5 or Eq. 1, if the interpolation process that is performed at the interpolator 34 of FIG. 3 results in an increase relative to the original color value, the interpolated color value is reduced, but only to the extent that it reaches the original color value (steps 70, 72 and 74, along with step 76). Similarly, if the interpolation at the interpolator 34 drove the value downwardly, the value is increased, but only to the extent that it reaches the original color value (steps 80, 82 and 84, along with step 76).

Forms for the individual red, green and blue interpolated color values of a Bayer color filter mosaic are:

$$\hat{x}_{red} = \begin{cases} \bar{x}_{red} - \tilde{x}_{negred} & \text{if } \bar{x}_{red} > x_{cent} \text{ and } \bar{x}_{red} - \tilde{x}_{negred} > x_{cent}, \\ \bar{x}_{red} + \tilde{x}_{posred} & \text{if } \bar{x}_{red} < x_{cent} \text{ and } \bar{x}_{red} + \tilde{x}_{posred} < x_{cent}, \text{ or} \\ x_{cent} & \text{otherwise} \end{cases} \quad \text{Eq. 2}$$

$$\hat{x}_{grn} = \begin{cases} \bar{x}_{grn} - \tilde{x}_{neggrn} & \text{if } \bar{x}_{grn} > x_{cent} \text{ and } \bar{x}_{grn} - \tilde{x}_{neggrn} > x_{cent}, \\ \bar{x}_{grn} + \tilde{x}_{posgrn} & \text{if } \bar{x}_{grn} < x_{cent} \text{ and } \bar{x}_{grn} + \tilde{x}_{posgrn} < x_{cent}, \text{ or} \\ x_{cent} & \text{otherwise} \end{cases} \quad \text{Eq. 3}$$

$$\hat{x}_{blu} = \begin{cases} \bar{x}_{blu} - \tilde{x}_{negblu} & \text{if } \bar{x}_{blu} > x_{cent} \text{ and } \bar{x}_{blu} - \tilde{x}_{negblu} > x_{cent}, \\ \bar{x}_{blu} + \tilde{x}_{posblu} & \text{if } \bar{x}_{blu} < x_{cent} \text{ and } \bar{x}_{blu} + \tilde{x}_{posblu} < x_{cent}, \text{ or} \\ x_{cent} & \text{otherwise} \end{cases} \quad \text{Eq. 4}$$

where $\hat{x}_{red}$, $\hat{x}_{grn}$ and $\hat{x}_{blu}$ are the output adjusted red, green and blue ICVs (from steps 74, 76 and 84), $\bar{x}_{red}$, $\bar{x}_{grn}$ and $\bar{x}_{blu}$ are the red, green and blue ICVs prior to adjustment, $\tilde{x}_{negred}$, $\tilde{x}_{posred}$, $\tilde{x}_{neggrn}$, $\tilde{x}_{posgrn}$, $\tilde{x}_{negblu}$ and $\tilde{x}_{posblu}$ are the red, green and blue negative and positive adjustment values identified in steps 68 and 78.

The negative and the positive adjustment values $\tilde{x}_{neg}$ and $\tilde{x}_{pos}$ are:

$$\tilde{x}_{neg} = \max_d [w_{negpat_d} f_{negpat_d}(x)] \quad \text{Eq. 5}$$

$$\tilde{x}_{pos} = \max_d [w_{pospat_d} f_{pospat_d}(x)] \quad \text{Eq. 6}$$

where $d=0, 1, \ldots, D-1$ is the appropriate pattern dimension index, $w_{negpat_d}$ and $w_{pospat_d}$ are adjustment weights for the negative and positive adjustments, and $f_{negpat_d}(x)$ and $f_{pospat_d}(x)$ are negative and positive adjustment functions of local neighborhood sample patterns.

Forms for individual negative and positive adjustment values for red, green and blue in a Bayer color filter mosaic are:

$$\tilde{x}_{negred} = \max_d [w_{negredpat_d} f_{negredpat_d}(x)], \quad \text{Eq. 7}$$

$$\tilde{x}_{posred} = \max_d [w_{posredpat_d} f_{posredpat_d}(x)], \quad \text{Eq. 8}$$

$$\tilde{x}_{neggrn} = \max_d [w_{neggrnpat_d} f_{neggrnpat_d}(x)], \quad \text{Eq. 9}$$

$$\tilde{x}_{posgrn} = \max_d [w_{posgrnpat_d} f_{posgrnpat_d}(x)], \quad \text{Eq. 10}$$

$$\tilde{x}_{negblu} = \max_d [w_{negblupat_d} f_{negblupat_d}(x)], \quad \text{Eq. 11}$$

$$\tilde{x}_{posblu} = \max_d [w_{posblupat_d} f_{posblupat_d}(x)], \quad \text{Eq. 12}$$

where $w_{negredpat_d}$, $w_{posredpat_d}$, $w_{neggrnpat_d}$, $w_{posgrnpat_d}$, $w_{negblupat_d}$, $w_{posblupat_d}$, $f_{negredpat_d}(x)$, $f_{posredpat_d}(x)$, $f_{neggrnpat_d}(x)$, $f_{posgrnpat_d}(x)$, $f_{negblupat_d}(x)$, $f_{posblupat_d}(x)$ are adjustment weights and functions of local neighborhood sample patterns for red, green and blue interpolation.

The local neighborhood sample pattern functions are:

$$f_{negpat_d}(x) = \begin{cases} \max[f_{neg_d}(x) + f_{neg_d}(x_{grn}) + f_{neg_d}(x_{cent})] - b_d & \text{if } \max[.] > b_d, \text{ or} \\ 0 & \text{otherwise} \end{cases} \quad \text{Eq. 13}$$

$$f_{pospat_d}(x) = \begin{cases} \max[f_{pos_d}(x) + f_{pos_d}(x_{grn}) + f_{pos_d}(x_{cent})] - b_d & \text{if } \max[.] > b_d, \text{ or} \\ 0 & \text{otherwise} \end{cases} \quad \text{Eq. 14}$$

where $b_d$ is an activation threshold bias term, $f_{neg_d}(x)$ and $f_{pos_d}(x)$ are functions of the local neighborhood samples that are the same color as the color being interpolated (except green samples), $f_{neg_d}(x_{grn})$ and $f_{pos_d}(x_{grn})$ are functions of the local neighborhood green samples (except a center sample), and $f_{neg_d}(x_{cent})$ and $f_{pos_d}(x_{cent})$ are functions of the center sample (red, green or blue). Note that the bias term $b_d$ performs a variable activation thresholding function, with $f_{negpat_d}(x)$, $f_{pospat_d}(x) > 0$ only if $\max[.] > b_d$.

The local neighborhood sample pattern functions for red, green and blue interpolation are:

$$f_{negredpat_d}(x) = \begin{cases} \max[f_{neg_d}(x_{red}) + f_{neg_d}(x_{grn}) + f_{neg_d}(x_{cent})] - b_d & \text{if } \max[\cdot] > b_d, \text{ or} \\ 0 & \text{otherwise} \end{cases} \quad \text{Eq. 15}$$

$$f_{posredpat_d}(x) = \begin{cases} \max[f_{pos_d}(x_{red}) + f_{pos_d}(x_{grn}) + f_{pos_d}(x_{cent})] - b_d & \text{if } \max[\cdot] > b_d, \text{ or} \\ 0 & \text{otherwise} \end{cases} \quad \text{Eq. 16}$$

$$f_{neggrnpat_d}(x) = \begin{cases} \max[f_{neg_d}(x_{grn}) + f_{neg_d}(x_{cent})] - b_d & \text{if } \max[\cdot] > b_d, \text{ or} \\ 0 & \text{otherwise} \end{cases} \quad \text{Eq. 17}$$

$$f_{posgrnpat_d}(x) = \begin{cases} \max[f_{pos_d}(x_{grn}) + f_{pos_d}(x_{cent})] - b_d & \text{if } \max[\cdot] > b_d, \text{ or} \\ 0 & \text{otherwise} \end{cases} \quad \text{Eq. 18}$$

$$f_{negblupat_d}(x) = \begin{cases} \max[f_{neg_d}(x_{blu}) + f_{neg_d}(x_{grn})] + f_{neg_d}(x_{cent})] - b_d & \text{if } \max[\cdot] > b_d, \text{ or} \\ 0 & \text{otherwise} \end{cases} \quad \text{Eq. 19}$$

$$f_{posblupat_d}(x) = \begin{cases} \max[f_{pos_d}(x_{blu}) + f_{pos_d}(x_{grn})] + f_{pos_d}(x_{cent})] - b_d & \text{if } \max[\cdot] > b_d, \text{ or} \\ 0 & \text{otherwise} \end{cases} \quad \text{Eq. 20}$$

where $f_{neg_d}(x_{red})$, $f_{pos_d}(x_{red})$, $f_{neg_d}(x_{grn})$, $f_{pos_d}(x_{grn})$, $f_{neg_d}(x_{blu})$, $f_{pos_d}(x_{blu})$, are negative and positive functions of the local neighborhood red, green and blue samples, except the center sample.

The negative and positive local neighborhood sample functions are:

$$f_{neg_d}(x) = \sum_{n_1,n_2,p} w_{neg}[n_1, n_2, p, d] x[n_1, n_2] \quad \text{Eq. 21}$$

$$f_{pos_d}(x) = \sum_{n_1,n_2,p} w_{pos}[n_1, n_2, p, d] x[n_1, n_2] \quad \text{Eq. 22}$$

where $p=0, 1, \ldots, P-1$ is the pattern index, and $w_{neg}[\cdot]$, $w_{pos}[\cdot] \in \{\sim1, 1\}$ are sample weights, with $\sim1$ defined as the one's complement of the sample value in base-2, unsigned-binary representation. The same 2D location indices $n_1$, $n_2$ are restricted to values from $0, 1, \ldots, N-1$ where the required color sample is present in the mosaic.

The local neighborhood sample functions for red, green, blue and center samples are:

$$f_{neg_d}(x_{red}) = \sum_{n_1,n_2,p} w_{negred}[n_1, n_2, p, d] x_{red}[n_1, n_2] \quad \text{Eq. 23}$$

$$f_{pos_d}(x_{red}) = \sum_{n_1,n_2,p} w_{posred}[n_1, n_2, p, d] x_{red}[n_1, n_2] \quad \text{Eq. 24}$$

$$f_{neg_d}(x_{grn}) = \sum_{n_1,n_2,p} w_{neggrn}[n_1, n_2, p, d] x_{grn}[n_1, n_2] \quad \text{Eq. 25}$$

-continued $$f_{pos_d}(x_{gm}) = \sum_{n_1,n_2,p} w_{posgm}[n_1, n_2, p, d]x_{gm}[n_1, n_2]$$ Eq. 26

$$f_{neg_d}(x_{blu}) = \sum_{n_1,n_2,p} w_{negblu}[n_1, n_2, p, d]x_{blu}[n_1, n_2]$$ Eq. 27

$$f_{pos_d}(x_{blu}) = \sum_{n_1,n_2,p} w_{posblu}[n_1, n_2, p, d]x_{blu}[n_1, n_2]$$ Eq. 28

$$f_{neg_d}(x_{cent}) =$$ Eq. 29

$$\begin{cases} w_{negred}\left[\frac{N-1}{2}, \frac{N-1}{2}, d\right]x_{red}\left[\frac{N-1}{2}, \frac{N-1}{2}\right] & \text{for red center sample,} \\ w_{neggm}\left[\frac{N-1}{2}, \frac{N-1}{2}, d\right]x_{gm}\left[\frac{N-1}{2}, \frac{N-1}{2}\right] & \text{for green center sample, or} \\ w_{negblu}\left[\frac{N-1}{2}, \frac{N-1}{2}, d\right]x_{blu}\left[\frac{N-1}{2}, \frac{N-1}{2}\right] & \text{for blue center sample} \end{cases}$$

$$f_{pos_d}(x_{cent}) =$$ Eq. 30

$$\begin{cases} w_{posred}\left[\frac{N-1}{2}, \frac{N-1}{2}, d\right]x_{red}\left[\frac{N-1}{2}, \frac{N-1}{2}\right] & \text{for red center sample,} \\ w_{posgm}\left[\frac{N-1}{2}, \frac{N-1}{2}, d\right]x_{gm}\left[\frac{N-1}{2}, \frac{N-1}{2}\right] & \text{for green center sample, or} \\ w_{posblu}\left[\frac{N-1}{2}, \frac{N-1}{2}, d\right]x_{blu}\left[\frac{N-1}{2}, \frac{N-1}{2}\right] & \text{for blue center sample} \end{cases}$$

The sample 2D location indices $n_1$, $n_2$ are restricted to values from $0, 1, \ldots, N-1$, where the corresponding sample value is present in the mosaic.

EXAMPLE OF IMPLEMENTATION

As one example of the implementation of the invention, FIG. 6 through FIG. 21 show different sets of reference patterns. Each even-numbered figure shows reference patterns 86 for one of the eight possible input-output configurations of the Bayer mosaic pattern, while each odd-numbered figure shows both the pattern sample locations 88 and the pattern output value assignments 90 for the preceding even-numbered figure. There are eight possible input-output configurations, since there are four different Bayer color sample types, with each having two interpolated center color outputs. The four different Bayer color sample types are:

(1) Red samples (R),
(2) Green samples in rows with red samples (GR),
(3) Green samples in rows with blue samples (GB), and
(4) Blue samples (B).

Figure 20:
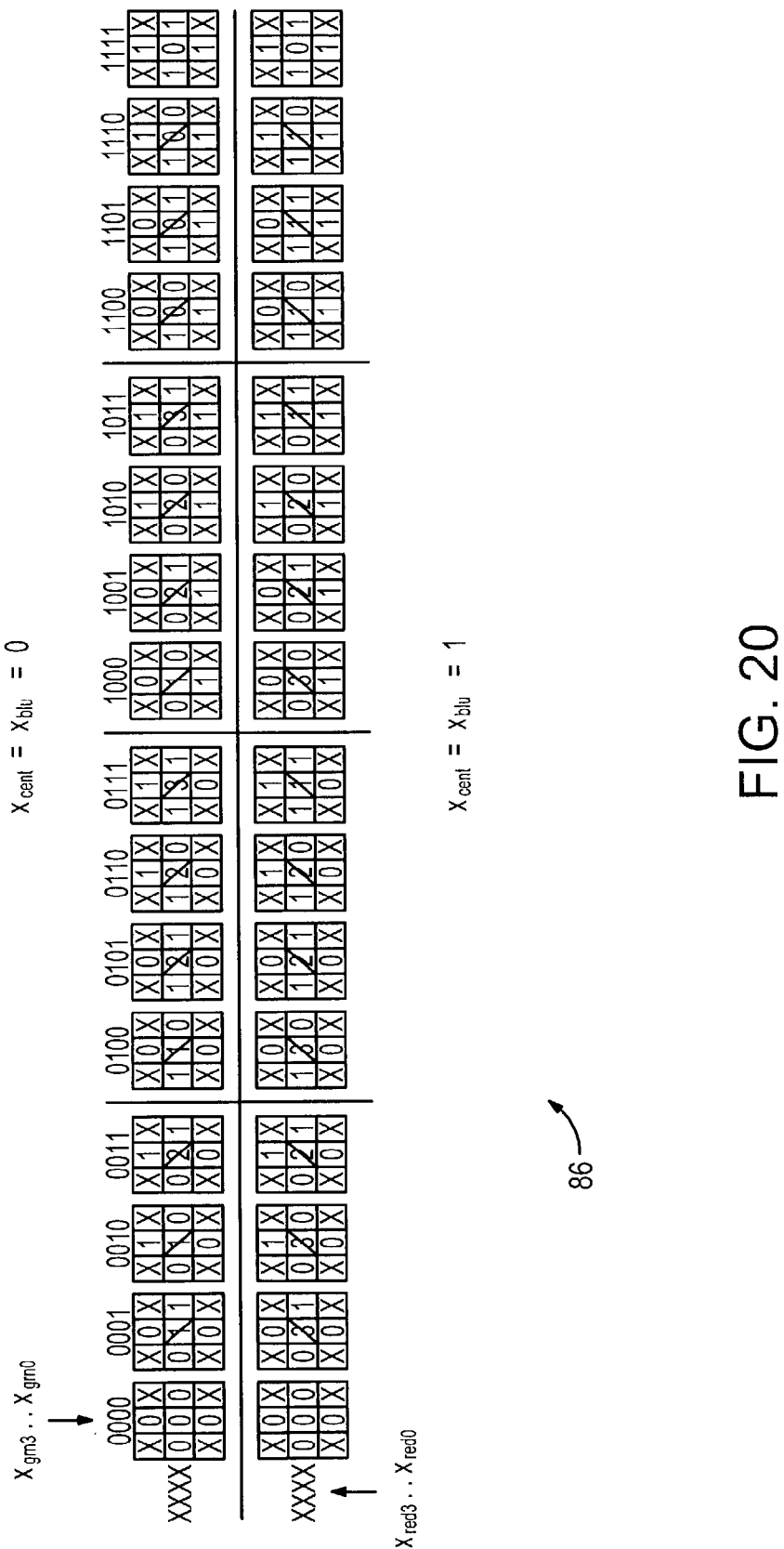
FIGS. 20 and 21 represent an example of the use of a set of reference patterns to be used when the original center pixel location is blue, but the output value is green.
Figure 21:
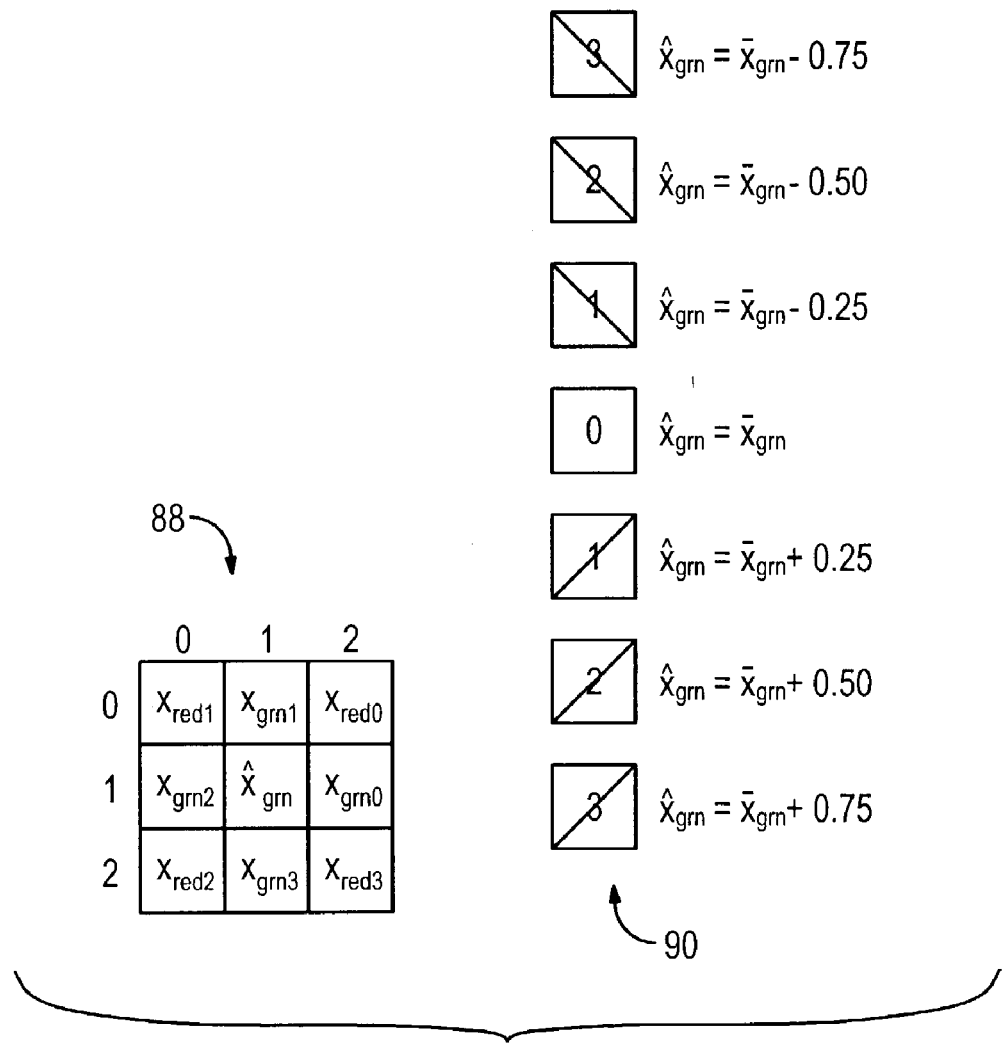

The patterns grouped according to their center sample colors are:
R-Center Patterns={R-Center G-Output Patterns, (FIG. 6)
  R-Center B-Output Patterns}, (FIG. 8)
GR-Center Patterns={GR-Center R-Output Patterns, (FIG. 10)
  GR-Center B-Output Patterns}, (FIG. 12)
GB-Center Patterns={GB-Center R-Output Patterns, (FIG. 14)
  GB-Center B-Output Patterns}, (FIG. 16)
B-Center Patterns={B-Center R-Output Patterns, (FIG. 18)
  B-Center G-Output Patterns}. (FIG. 20)

The pattern number, P, is equal to the total number of input-output configurations, so P=8 for this case.

For the reference patterns 86 of FIGS. 6–21, the notation x, $\hat{x} \in \{0,1\}$ applies, where x, $\hat{x}=0$ represents the smallest value, x, $\hat{x}=1$ represents the largest value, and x=X represents a value of input sample x that is irrelevant to the interpolated color output value $\hat{x}$. The $\hat{x}$ output values are assigned according to the assumptions that were identified previously. For a center sample value of either $x_{cent}=0$ or $x_{cent}=1$ in the patterns, the output $\hat{x}$ is assigned a value of either $\hat{x}=0$ or $\hat{x}=1$, such that $\hat{x}$ is equal to the center sample value when the pattern shows a large luminance gradient.

FIGS. 6–21 also show the assigned values of $\tilde{x}_{neg}$ and $\tilde{x}_{pos}$. The direction of the selective adjustment to the interpolated value ($\bar{x}$) is indicated by the directions of the diagonal lines. Specifically, a diagonal line extending downwardly with movement from left to right indicates a positive value ($\tilde{x}_{pos}$), while a diagonal line extending upwardly with movement to the right indicates a negative value ($\tilde{x}_{neg}$). The degree of adjustment is indicated by the numbers 0, 1, 2, 3 and 4, with the higher numbers indicating a greater degree of adjustment. For no adjustment (i.e., $\tilde{x}_{neg}$, $\tilde{x}_{pos}=0$), no diagonal line is shown.

The degree and the direction of adjustment are defined from the pattern sample values as the difference between the assigned output value and the interpolated value, shown by rearranging Eq. 1 as:

$$\tilde{x}_{neg} = \begin{cases} |\hat{x} - \bar{x}| & \text{for } \hat{x} - < 0, \text{ or} \\ 0 & \text{otherwise} \end{cases}$$ Eq. 31 and $$\tilde{x}_{pos} = \begin{cases} |\hat{x} - \bar{x}| & \text{for } \hat{x} - < 0, \text{ or} \\ 0 & \text{otherwise} \end{cases}$$ Eq. 32

For sample pattern values quantized to x, $\tilde{x} \in \{0, 1\}$, the possible adjusted interpolated values are $\bar{x} \in \{0, 0.25, 0.5, 0.75, 1\}$. From Eq. 31 and Eq. 32, the possible adjustment values are therefore $\tilde{x}_{neg}, \tilde{x}_{pos} \in \{0, 0.25, 0.5, 0.75, 1\}$. These values determine the adjustment weights $w_{negpat_d}$ and $w_{pospat_d}$ values of Eq. 5 and Eq. 6. The weights $w_{negpat_d}$ and $w_{pospat_d}$ are defined as being equal to the change in $\tilde{x}_{neg_d}$ and $\tilde{x}_{pos_d}$ versus the change in the input sample pattern functions $f_{negpat}(x)$ and $f_{pospat}(x)$, shown by rearranging Eq. 5 and Eq. 6 as:

$$w_{negpat_d} = \frac{\tilde{x}_{neg_d}}{f_{negpat_d}(x)} \text{ and} \quad \text{Eq. 33}$$

$$w_{pospat_d} = \frac{\tilde{x}_{pos_d}}{f_{pospat_d}(x)} \text{ and} \quad \text{Eq. 34}$$

The $\tilde{x}_{neg}$ and $\tilde{x}_{pos}$ values above are equal to the change in $\tilde{x}_{neg}$ and $\tilde{x}_{pos}$ over the full range of $f_{negpat}(x)$ and $f_{pospat}(x)$, as produced by the entire range of associated input values, from the full pattern value, to the full complement of the same pattern value. Therefore, the $w_{negpat_d}$ and $w_{pospat_d}$ values are numerically equivalent to the $\tilde{x}_{neg_d}$ and $\tilde{x}_{pos_d}$ values, i.e., $w_{negpat_d}, w_{pospat_d} = \tilde{x}_{neg_d}, \tilde{x}_{pos_d} \in \{0, 0.25, 0.5, 0.75, 1\}$. Also, the dimension number D is equal to the total number of $\tilde{x}_{neg_d}$ or $\tilde{x}_{pos_d}$ values. For the 3×3 Bayer mosaic under consideration, D=5.

For each different adjustment degree and direction $\tilde{x}_{neg_d}$ and $\tilde{x}_{pos_d}$ shown in FIGS. 6–21, separate input-output transfer function equations are developed from the pattern values, as given by Eq. 21 and Eq. 22. These equations are then algebraically reduced to minimized equations. With the pattern input values already quantized to $x \in \{0, 1\}$, the pattern adjustment output values are likewise quantized to $\tilde{x} \in \{0, 1\}$, with $\tilde{x}$ set to $\tilde{x}=1$ for any non-zero $\tilde{x}$ value, and set to $\tilde{x}=0$ otherwise. This allows the use of standard Boolean algebraic minimization techniques to minimize the equations. The outputs of the minimized equations are summed and thresholded as shown in Eq. 13 and Eq. 14. These equation outputs are then scaled by their particular $w_{negpat_d}$ and $w_{pospat_d}$ values, and either added to or subtracted from the interpolated value $\tilde{x}$ to form the final output value $\hat{x}$, as shown by Eqs. 1, 5 and 6.

Examination of FIG. 6 through FIG. 21 reveals that out of the eight different input-output configurations, only three unique pattern sets exist. Grouping together identical pattern sets, the three groups of unique pattern sets are:

Patterns Group 1={R-Center G-Output Patterns, (FIG. 6)
  R-Center B-Output Patterns}, (FIG. 20)
Patterns Group 2={R-Center B-Output Patterns, (FIG. 8)
  B-Center R-Output Patterns}, (FIG. 18)
Patterns Group 3={GR-Center R-Output Patterns, (FIG. 10)
  GR-Center B-Output Patterns, (FIG. 12)
  GB-Center R-Output Patterns, (FIG. 14)
  GB-Center B-Output Patterns}. (FIG. 16)

This grouping allows the total number of interpolation kernels to be restricted to three, the total number of unique pattern sets. The patterns shown according to their group designations are:

R-Center Patterns={R-Center G-Output Patterns, (Group 1)
  R-Center B-Output Patterns}, (Group 2)
GR-Center Patterns={GR-Center R-Output Patterns, (Group 3)
  GR-Center B-Output Patterns}, (Group 3)
GB-Center Patterns={GB-Center R-Output Patterns, (Group 3)
  GB-Center B-Output Patterns}, (Group 3)
B-Center Patterns={B-Center R-Output Patterns, (Group 2)
  B-Center G-Output Patterns}. (Group 1)

This indicates a requirement for two sets of hardware implementing the Group 3 pattern interpolation for concurrently obtaining the two interpolated center color values of the GR-center and GB-center configurations.

B-Center Patterns={B-Center R-Output Patterns, (FIG. 18)
  B-Center G-Output Patterns}. (FIG. 20)

What is claimed is:

1. A method of processing an image signal comprising:
   (a) receiving said image signal as luminance values in a mosaic arrangement of pixel locations in which different said pixel locations are specific to different colors;
   (b) demosaicing said image signal by determining interpolated luminance values, such that each said pixel location is associated with a pre-demosaicing luminance value to which said pixel location is specific and at least one said interpolated luminance value;
   (c) identifying a particular interpolated luminance value and a neighborhood of said pixel locations in which said particular interpolated luminance value is at a central pixel location, said neighborhood having a luminance gradient pattern;
   (d) correlating said luminance gradient pattern with predetermined reference luminance gradient patterns to which pattern output values have been assigned, including associating one of said pattern output values with said particular interpolated luminance value on a basis of said pattern-to-pattern correlating;
   (e) repeating (c) and (d) for each of a plurality of said interpolated luminance values; and
   (f) determining adjusted interpolated luminance values as functions of relationships of said interpolated luminance values with selected pattern output values.

2. The method of claim 1 further comprising defining sets of said reference luminance gradient patterns in which each set is unique with respect to a combination of a color and a localized color scheme within said mosaic arrangement.

3. The method of claim 2 further comprising assigning one of said pattern output values to each said reference luminance gradient pattern based on the specific set in which said reference luminance gradient pattern resides.

4. The method of claim 3 wherein assigning said determining said adjusted interpolated luminance values includes defining negative values, zero values and positive adjustment values for said interpolated luminance values, said adjustment values being differences between said interpolated luminance values and said pattern output values.

5. The method of claim 1 wherein said determining each said adjusted interpolation luminance value for each said pixel location includes limiting each adjustment to a direction of said pre-demosaicing luminance value of said pixel location and limiting said variation to be less than or equal to a difference between said pre-mosaicing luminance value and said interpolated luminance value being adjusted.

6. The method of claim 1 wherein said reference luminance gradient patterns are defined as different possible combinations of minimums and maximums within a preselected neighborhood configuration of pixels.

7. The method of claim 6 further comprising defining said neighborhood configuration to be square and to have sides that consist of an odd number of said pixels.

8. The method of claim 1 wherein said image signal is acquired from an array of pixel sensors and wherein said demosalcing includes using binary interpolation techniques.

9. A system for processing a digitized image signal comprising:
 a source of a digitized image signal representative of a mosaic arrangement of pixel locations in which different pixel locations have color samples specific to different colors;
 an interpolator cooperative with said source and enabled to derive interpolated color values for said pixel locations based on said color samples of nearby pixel locations;
 a selector for identifying a set of reference patterns of reference values to be used in determining a possible adjustment to a specific said interpolated color value;
 a pattern correlator having inputs of said interpolated color values and said reference patterns, said pattern correlator being enabled to correlate a pattern of values nearby each said interpolated color value with one of said reference patterns; and
 an interpolation adjustor operatively associated with said pattern correlator to selectively vary said interpolated color values based on weights assigned to said reference patterns with which correlations are identified by said pattern correlator.

10. The system of claim 9 wherein said selector has access to storage of multiple said sets of reference patterns, each said set being specific to one of said colors and being specific to a particular localized configuration of colors in a neighborhood in which said specific one color is the color of said specific interpolated value to be possibly adjusted.

11. The system of claim 9 further comprising a threshold detector in cooperation with said interpolation adjustor to limit any specific variation of any said interpolated color value to the direction of said color sample of the same pixel location of said interpolated color value and to limit said specific variation to a difference between said interpolated color value and said color sample of said same pixel location.

12. The system of claim 9 wherein said interpolation adjustor is configured to calculate positive, negative and zero adjustment values on a basis of said weights and wherein said interpolation adjustor outputs final color values which define an output image signal.

* * * * *